(12) United States Patent
Jung et al.

(10) Patent No.: US 12,190,668 B2
(45) Date of Patent: Jan. 7, 2025

(54) SYSTEM AND METHOD FOR MANAGING UNATTENDED STORE REMOTELY

(71) Applicant: OHRAE INC., Busan (KR)

(72) Inventors: Jae Heon Jung, Busan (KR); Dong Uk Lee, Busan (KR); Seong Hee An, Yangsan-si (KR)

(73) Assignee: OHRAE INC., Busan (KR)

( * ) Notice: Subject to any disclaimer, the term of this patent is extended or adjusted under 35 U.S.C. 154(b) by 0 days.

(21) Appl. No.: 18/286,509

(22) PCT Filed: Apr. 12, 2022

(86) PCT No.: PCT/KR2022/005283
§ 371 (c)(1),
(2) Date: Oct. 11, 2023

(87) PCT Pub. No.: WO2022/220544
PCT Pub. Date: Oct. 20, 2022

(65) Prior Publication Data
US 2024/0194012 A1    Jun. 13, 2024

(30) Foreign Application Priority Data
Apr. 12, 2021  (KR) .......................... 10-2021-0047039

(51) Int. Cl.
*G06Q 10/02*    (2012.01)
*G07C 9/27*    (2020.01)

(52) U.S. Cl.
CPC ............... *G07C 9/27* (2020.01); *G06Q 10/02* (2013.01)

(58) Field of Classification Search
CPC .................................. G07C 9/27; G06Q 10/02
See application file for complete search history.

(56) References Cited

U.S. PATENT DOCUMENTS

2013/0221094 A1* 8/2013 Smith ............... G07C 9/00309
235/382

FOREIGN PATENT DOCUMENTS

| KR | 10-2010-0076155 A |   | 7/2010 |   |   |
|---|---|---|---|---|---|
| KR | 10-1816876 B1 |   | 1/2018 |   |   |
| KR | 10-1897976 B1 |   | 9/2018 |   |   |
| KR | 10-1923988 B1 |   | 11/2018 |   |   |
| KR | 10-2019-0105757 A |   | 9/2019 |   |   |
| KR | 10-2019-0109223 A |   | 9/2019 |   |   |
| KR | 102021993 B1 | * | 9/2019 | ............ | G06Q 50/10 |
| KR | 10-2059683 B1 |   | 12/2019 |   |   |
| KR | 10-2021-0127627 A |   | 10/2021 |   |   |
| KR | 10-2311077 B1 |   | 10/2021 |   |   |

OTHER PUBLICATIONS

International Search Report for PCT/KR2022/005283 dated Jul. 22, 2022.
Written Opinion for PCT/KR2022/005283 dated Jul. 22, 2022.

* cited by examiner

*Primary Examiner* — George Chen
*Assistant Examiner* — Duane N. Moore
(74) *Attorney, Agent, or Firm* — Sughrue Mion, PLLC

(57) ABSTRACT

Provided are a system and a method for managing an unmanned store remotely, particularly a system and a method that can remotely perform unmanned store management, including door control, lighting control, kiosk management, etc., using Internet of Things (IoT) technology.

20 Claims, 29 Drawing Sheets

SEPARATE KIOSK SETTING MANUAL

INTEGRATED KIOSK SETTING MANUAL

INTEGRATED KIOSK SETTING MANUAL

IOT-BASED UNMANNED STORE REMOTE MANAGEMENT SYSTEM

IOT-BASED UNMANNED STORE REMOTE MANAGEMENT SYSTEM

SYSTEM AND METHOD FOR MANAGING UNATTENDED STORE REMOTELY

This Application is a National Stage of International Application No. PCT/KR2022/005283 filed Apr. 12, 2022, claiming priority based on Korean Patent Application No. 10-2021-0047039 filed Apr. 12, 2021.

TECHNICAL FIELD

The present invention relates to a system and a method for managing an unmanned store remotely, particularly a system and a method that can remotely perform unmanned store management, including door control, lighting control, kiosk management, etc., using Internet of Things (IoT) technology.

BACKGROUND ART

With the advancement of Internet of Things (IoT) technology, interest in unmanned stores is increasing as demand for contactless or non-face-to-face services increases. Unmanned stores can be applied to numerous businesses. For example, unmanned stores can be applied not only to businesses that provide tangible products, such as restaurants and stores, but also to businesses that provide spaces or intangible services, such as reading room business and study room business. Accordingly, there is an increasing demand for unmanned store operation methods that can provide convenience and efficiency to both users who operate unmanned stores and users of unmanned stores.

DISCLOSURE

Technical Problem

One technical problem to be solved by the present invention is to provide a system and a method for managing an unmanned store remotely, capable of managing an unmanned store remotely using IoT technology.

In addition, the other technical problem to be solved by the present invention is to provide a system and a method for managing an unmanned store remotely, capable of operating: entering (or checking in) an unmanned store, going out from an unmanned store, and leaving (or checking out) an unmanned store, using IoT technology.

The technical problems of the present invention are not limited to the technical problems mentioned above, and other technical problems not mentioned will be clearly understood by those skilled in the art from the description below.

Technical Solution

A method for managing an unmanned store remotely according to one aspect of the present invention, may include receiving a request for entering from a user; determining whether the user's ticket is valid; determining whether the ticket is in enter state or go out state when the ticket is valid; and opening a door by controlling a short signal provided from a solid state relay when the ticket is in enter state.

The opening a door by controlling a short signal may include causing the solid state relay to output a short signal for a predetermined time by controlling an Mqtt server and a smart plug electrically connected to the solid state relay.

The method may further include encouraging the user to purchasing a ticket when the ticket is invalid.

The method may further include determining whether the ticket holds an assigned seat; and opening a door by controlling the short signal when the ticket holds the assigned seat.

The method may further include inducing the user to select a seat when the ticket does not hold the assigned seat.

The method may further include opening a door by controlling the short signal when the request for entering corresponds to a master key.

The method may further include receiving a store identifier identifying a store to which the door is to be opened among a plurality of stores; receiving a door identifier identifying a door to be opened among one or more doors of the store identified by the store identifier; obtaining a serial number (S/N) of a smart plug controlling the solid state relay from a database using at least one of the store identifier and the door identifier; and opening a door by controlling a short signal provided from a solid state relay of the store to be opened using the serial number of the smart plug.

A method for managing an unmanned store remotely according to one aspect of the present invention, may include receiving a request for going out/leaving from a user; determining whether the user's ticket is valid; determining whether the user's usage time has been exceeded when the ticket is valid; and opening a door by controlling a short signal provided from a solid state relay when the user's usage time has not been exceeded.

The opening a door by controlling a short signal may include causing the solid state relay to output a short signal for a predetermined time by controlling an Mqtt server and a smart plug electrically connected to the solid state relay.

The method may further include encouraging the user to purchasing a ticket when the ticket is invalid.

The method may further include determining whether the user has completed settlement of an excess amount when the user's usage time exceeds; and opening a door by controlling the short signal when the user has completed settlement of the excess amount.

The method may further include inducing the user to settle the excess amount when the user has not completed settlement of the excess amount.

The method may further include opening a door by controlling the short signal when the request for going out/leaving corresponds to a master key.

A method for managing an unmanned store remotely according to one aspect of the present invention, may include receiving, by a service server, a light bulb control request including an unmanned store identifier (shop_id) from a store operator device; identifying, by the service server, an unmanned store corresponding to the unmanned store identifier (shop_id); determining, by the service server, whether the identified unmanned store is an integrated kiosk setting using only an entry/exit kiosk that handles all entering, going out, and leaving, or a separated kiosk setting using a separately configured an entry kiosk and an exit kiosk; transmitting, by the service server, a light bulb control command corresponding to the light bulb control request to the entry/exit kiosk when it is determined that the identified unmanned store is the integrated kiosk setting; transmitting, by the service server, the light bulb control command only to the exit kiosk when it is determined that the identified unmanned store is the separated kiosk setting; and controlling, by the entry/exit kiosk or the exit kiosk which has received the light bulb control command, a light bulb by transmitting the light bulb control command received from the service server to a bridge, wherein the entry/exit kiosk or the exit kiosk and the bridge are configured on the same bandwidth network through a Wi-Fi router.

The light bulb control request may include at least one of a request to turn on/off all light bulbs in an unmanned store, a request to turn on/off only light bulbs of a specific seat, and a request to change color and brightness of light bulbs of a specific seat.

The light bulb control request that the service server receives from the store operator device may further include a bulb identifier (bulb_id) of a specific seat when the bulb control request is a request to turn on/off only light bulbs of the specific seat, and the service server may generate the light bulb control command based on the bulb identifier (bulb_id) of the specific seat.

The light bulb control request that the service server receives from the store operator device may further include a bulb identifier (bulb_id) of a specific seat, a desired color value, and a desired brightness value when the light bulb control request is a request to change color and brightness of light bulbs of the specific seat, and the service server may generate the light bulb control command based on the bulb identifier (bulb_id) of the specific seat, the desired color value, and the desired brightness value.

The method may further include transmitting, by the store operator device, IP information for each bridge added or modified to add or modify information about the bridge to the service server, transmitting, by the store operator device, a username value for identifying a bridge to the service server, or transmitting, by the store operator device, a group_id value for identifying multiple light bulbs that can be controlled by one bridge to the service server.

The method may further include transmitting, by the store operator device, a bulb_id value for identifying light bulb added or modified for each seat to add or modify the bulb ID for each seat to the service server.

The method may further include transmitting, by the store operator device, a desired basic color value or a basic brightness value to set a basic color value or a basic brightness value of light bulbs for each store to the service server.

A method for managing an unmanned store remotely according to one aspect of the present invention, may include receiving, by a service server, a kiosk restart request including an unmanned store identifier (shop_id), a kiosk identifier (shop_in, ship_out), and a floor information (layer_info) from a store operator device; identifying, by the service server, an unmanned store corresponding to the unmanned store identifier (shop_id); specifying, by the service server, a kiosk to be restarted based on the kiosk identifier (shop_in, ship_out) and the layer information (layer_info); transmitting, by the service server, a kiosk restart command corresponding to the kiosk restart request to the specified kiosk when the kiosk to be restarted is specified; and performing, by the specified kiosk, a restart according to the kiosk restart command received from the service server.

The method may further include transmitting, by a manager device, a command to collectively update all kiosks in an unmanned store to the service server; and performing a kiosk update using an update image according to a kiosk model installed in the identified unmanned store by the service server according to the command.

The method may further include transmitting, by a manager device, a command to update a specific kiosk of an unmanned store to the service server; and performing a kiosk update using an update image according to the specific kiosk model according to the command.

Advantageous Effects

According to embodiments of the present invention, the doors of an unmanned store can be conveniently controlled using IoT technology. In addition, by working in conjunction with unmanned store service provision software and unmanned store operation software that can remotely manage unmanned stores, it is possible to efficiently manage entering (or checking in) an unmanned store, going out from an unmanned store, and leaving (or checking out) an unmanned store, of unmanned store users. Accordingly, not only can the satisfaction of users who receive services from unmanned stores increase, but the convenience of operators operating unmanned stores can also increase.

Additionally, according to embodiments of the present invention, unmanned stores can be conveniently managed remotely using IoT technology. Specifically, the store owner or manager can cause the service server to control the door by remotely transmitting data or commands for door control to the service server, or can cause the service server to control the lighting by remotely transmitting data or commands for lighting control to the service server, or can cause the service server to restart the kiosk or update the kiosk by remotely transmitting data or commands for kiosk restart or kiosk update to the service server. Accordingly, the convenience can be increased for store owners and managers who manage unmanned stores remotely.

MODE FOR INVENTION

Figure 1:
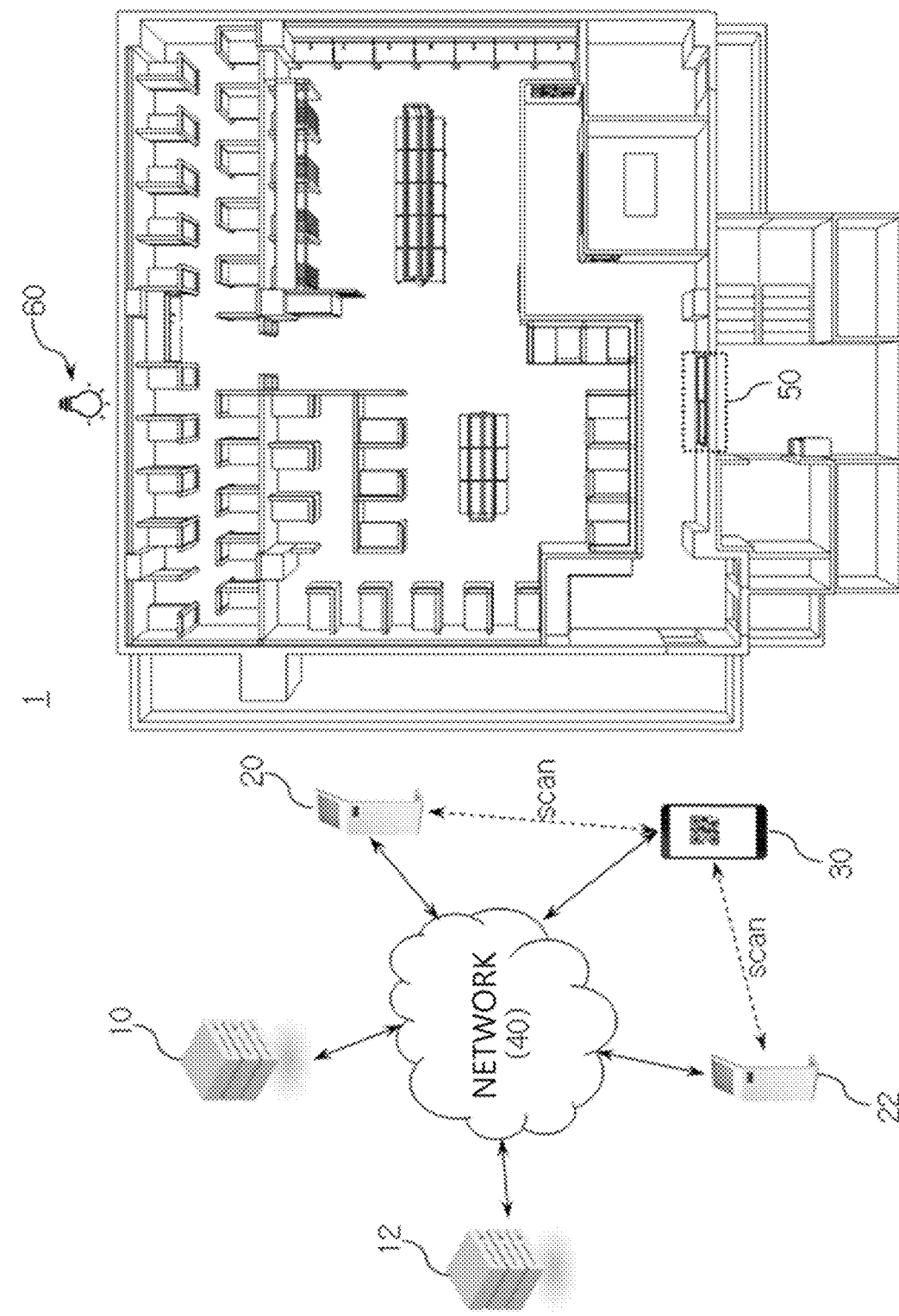
FIG. 1 illustrates a system for managing an unmanned store remotely according to an embodiment of the present invention.

Hereinafter, embodiments of the present invention will be described in detail with reference to the accompanying drawings to enable easy understanding and implementation by those of ordinary skill in the art to which this invention pertains. However, the present invention may be implemented in many different forms and should not be construed as limited to the embodiments described herein. To clearly illustrate the invention, non-pertinent parts have been omitted from the drawings, and similar parts throughout the specification are marked with the similar reference numerals.

Throughout the specification and claims, when a part is described to "include" a certain component, it implies the inclusion of other components as well, not their exclusion, unless explicitly stated otherwise.

Furthermore, terms such as "part," "unit," "module," and similar terms in the specification may denote a unit capable of performing at least one function or operation as described the present specification, and may be implemented through hardware, software, or a combination of both.

In this specification, an unmanned store may refer to a store operated in a way an operator does not reside on site. Specifically, an unmanned store refers a store that has automated at least some of the works or tasks required to operate the store, or a store where people can perform the works or tasks from a remote location.

Representative examples of unmanned stores may include unmanned study cafes or unmanned reading rooms. What makes an unmanned study cafe different from a regular study cafe is that various works or tasks required to run a study cafe, such as user seat designation, use time allocation, usage fee payment, and member management, etc. are implemented using information and communication technology (ICT), so there is no need for an operator to reside on site.

FIG. 1 illustrates a system for managing an unmanned store remotely according to an embodiment of the present invention.

Referring to FIG. 1, the system for managing an unmanned store remotely 1 may be an unmanned study cafe operated based on a ticket with a fixed usage period. With a ticket purchased in advance or on site, users of an unmanned study cafe can rent one of the seats provided in the store for a period determined by the type of the ticket. To implement this, the system for managing an unmanned store remotely 1 may include a service server 10, an Mqtt (Message queuing telemetry transport) server 12, kiosks 20, 22, and a user device 30. The service server 10, the Mqtt server 12, the kiosks 20, 22, and the user device 30 can exchange data with each other through the network 40. Additionally, a door 50 and lighting 60 are installed within the unmanned store.

The service server 10 may operate an unmanned store or provide overall operations related to providing services to users in an unmanned store. Specifically, the service server 10 may receive a service request related to an unmanned study cafe from the user through the kiosks 20, 22 or the user device 30 and provide the corresponding service. Specifically, the service server 10 can provide the services necessary for a user to use an unmanned store, for example, the service server 10 may control the door 50 installed in the store through the Mqtt server 12 or control the lighting 60 by controlling a bridge and smart bulbs.

The Mqtt server 12 can provide services related to IoT messaging using the Mqtt (Message queuing telemetry transport) protocol, which is an ISO standard (ISO/IEC PRF 20922) publish-subscribe based messaging protocol. The Mqtt protocol is designed to minimize power consumption and packet volume and is considered suitable for communications such as IoT and mobile applications, and characterized by adopting a broker, publisher, and subscriber structure, rather than a client-server structure such as HTTP (HyperText Transfer Protocol) and TCP (Transmission Control Protocol). Publishers publish topics, subscribers subscribe to topics, and brokers act as intermediaries between them, and multiple subscribers can subscribe to a single topic, making it useful for implementing 1:N communication.

In this specification, the service server 10 and the Mqtt server 12 may be implemented as physically separated computing devices or may be integrated into one computing device. Of course, the service server 10 may be implemented as physically a single computing device or may be implemented using physically a plurality of computing devices, and the same applies to the Mqtt server 12. In addition, the element "server" in this specification may refer to a hardware device equipped with a processor and a memory or may refer to software itself that runs on any computing device and can provide services, or sometimes refers to a form implemented by a combination of hardware and software.

The kiosks 20, 22 may be a computerized automated device designed to provide services to users while operating unmanned and installed at the entrance, exit, inside, etc. of an unmanned store. The kiosks 20, 22 may be implemented to include a processor, a memory, a storage, etc. to run software that provides services, as well as a device such as a display, a touch screen, a speaker, a printer, a camera, a thermal imaging camera, a barcode scanner, and a card reader to provide an input/output interface. Of course, the kiosks 20, 22 may further include various arbitrary devices required depending on the service provided, in addition to the devices listed above.

Depending on the specific implementation purpose, an unmanned store can be an integrated kiosk setting or a separated kiosk setting. The integrated kiosk setting refers to the use of a single entry/exit kiosk that handles all entering an unmanned store, going out from an unmanned store, and leaving an unmanned store, of unmanned store customers; while the separated kiosk setting refers to a case where one entry kiosk is set to handle entering an unmanned store of unmanned store customers, and another one exit kiosk is set to handle going out from an unmanned store, and leaving an unmanned store, of unmanned store customers. In this case, the entry kiosk may provide functions to purchase a ticket, to extend usage period of a ticket, to move a seat, and to process entering, and the exit kiosk may provide functions to extend usage period of a ticket, to move a seat, to process leaving, and to process going out. Unlike the entry kiosk, the exit kiosk does not provide functions to purchase a ticket and to process entering.

Of course, here, the integrated kiosk setting is mainly explained as using a single entry/exit kiosk, but if the unmanned store area is large or the unmanned store consists of multiple floors, multiple entry/exit kiosks can be used. Likewise, the separated kiosk setting is mainly described here as using one entry kiosk and one exit kiosk, but if the area of the unmanned store is large or the unmanned store consists of multiple floors, the number of entry kiosks and exit kiosks may increase further.

FIG. 1 shows a case where an unmanned store is set up as a separated kiosk setting, where the kiosk 20 can be used as an entry kiosk and the kiosk 22 can be used as an exit kiosk. If an integrated kiosk setting is implemented, unlike shown in FIG. 1, only one kiosk 20 will be used as a kiosk for entry and exit.

Hereinafter, unless there are clearly distinguishing features between the integrated kiosk setting and the separated kiosk setting, contents related to a system and a method for managing an unmanned store remotely according to embodiments of the present invention implemented in the integrated kiosk setting can also be applied to the separated kiosk setting, and the scope of modifications involved for such application is within the scope of the present invention. Likewise, unless there are clearly distinguishing features between the integrated kiosk setting and the separated kiosk setting, contents related to a system and a method for managing an unmanned store remotely according to embodiments of the present invention implemented in the separated kiosk setting can also be applied to the integrated kiosk setting, and the scope of modifications involved for such application is within the scope of the present invention.

The user device 30 may be a computing device used to enable users of an unmanned store to receive unmanned store services or to operate or manage an unmanned store. For example, the user device 30 may be implemented as a smartphone, a tablet computer, a laptop computer, a desktop computer, a wearable device, etc., but the scope of the present invention is not limited thereto, and the user device 30 may be implemented as any computing device capable of running software that provides services for unmanned store use, operation, and management, that is, unmanned store software.

Depending on the user, unmanned store software can be divided into unmanned store service software, unmanned store operation software, and unmanned store management software. Unmanned store service software is software used by customers who use unmanned stores (for example, students who use unmanned study cafes), unmanned store operation software is software used by store owners who operate a specific unmanned store, or franchise managers who can manage store owners for multiple stores (i.e., store operators) to operate unmanned stores and provide services to customers, unmanned store management software is software used by system managers who manage information and communication technology applied to unmanned stores, provide and maintain equipment and systems installed and operated in unmanned stores, unmanned store service software, and unmanned store operation software. Such unmanned store software may be referred to by various names such as unmanned store program, unmanned store application, unmanned store application program, and unmanned store app, but hereinafter they will be collectively referred to as 'unmanned store software', 'unmanned store user software', 'unmanned store operation software', and 'unmanned store management software'.

Accordingly, the user device 30 may be referred to as a customer device when unmanned store service software is executed, may be referred to as a store operator device when unmanned store operation software is executed, and may be referred to as a store manager device when unmanned store management software is executed.

Meanwhile, unmanned store service software for providing services to customers who want to use the unmanned store can be run not only in the user device 30 but also in the kiosks 20, 22. For example, a ticket purchased online by a customer through the user device 30 can be viewed at the kiosks 20, 22 and related service can be provided, and conversely, a ticket purchased on-site by the customer through the kiosk 20 can be searched online through the user device 30 and related services can be provided. And unmanned store service software may be executed independently on the user device 30 or the kiosks 20, 22, or, together with the service server 10 connected through the network 40, so that functions related to interfaces for interacting with users or operators may be executed on the user terminal 30 or kiosks 20 and 22, and internal operations may be executed on the service server 10.

Hereinafter, for convenience of explanation, the main example will be described as an unmanned study cafe that rents study space without an operator stationed on site, however, it is clear embodiments of the present invention can be applied not only unmanned study cafes, but also to any various types of unmanned stores.

The user device 30 can run unmanned store service software provided to customers of the unmanned store. Accordingly, the user device 30 can provide services related to unmanned stores to users even in places other than the site (i.e., unmanned stores) through networks including the Internet.

For example, unmanned store service software may provide users with a function that allows them to purchase a ticket to use an unmanned store. Here, the ticket may be subdivided into several types of tickets, such as a ticket for non-reserved seats with free seat selection, a ticket for fixed seats with assigned seats for a certain period of time, a ticket for study rooms with multiple seats assigned instead of single seats, and a ticket for lockers for storing items only, so that various types of seats can be used.

Meanwhile, the ticket may include a same-day ticket, a time ticket, a period ticket, a pre-booking period ticket, a pre-booking time ticket, etc., depending on the length of time available. Here, a same-day ticket refers to a ticket that can be used by time (e.g., 1 hour, 2 hours, 8 hours, etc.) only during the day; a time ticket and a pre-booking time ticket refer to tickets that can be used for a charged time (e.g., 30 hours, 50 hours, 100 hours, 200 hours, etc.) without any period limit (of course, no period limit means that there is no limit to the period of use within the validity period of the ticket, for example, a 30-hour ticket may have a validity period of 14 days, and a 50-hour ticket and a 100-hour ticket may have a validity period of 2 weeks and 2 months, respectively, meanwhile, in the case of a 200-hour ticket, an unlimited validity period may be set); and a pre-booking time ticket refers to a time ticket that can be used during the charged time on a pre-booked date. Meanwhile, a period ticket refers to a ticket that can be used for an unlimited period of time (e.g., 15 days, 30 days, 45 days, 60 days, etc.), and a pre-booking period ticket refers to a period ticket that can be used for a certain period of time from the date of advance reservation.

Of course, the types of tickets are not limited to the above-mentioned examples and may be changed depending on the actual purpose of implementation.

In addition, the unmanned store service software may further a function for the user to select a store to use, a function to select a ticket to use, a function to select a date and time to use a ticket, a payment function, and a function to contact the store or the operator, etc. Here, the payment function may include, in addition to the general payment function, a function that receives information about frequently used cards from the user, designates the card as a frequently used card, and automatically makes payments using that card when purchasing a ticket, or a simple payment function that allows payment through other methods such as Zero Pay, Kakao Pay, LG Pay, and Samsung Pay. The simple payment function can also provide a function to delete a specified card. In addition, the payment function may be linked to the biometric sensor (e.g., fingerprint recognition sensor, iris recognition sensor, face recognition sensor) of the kiosk (20, 22) or the user terminal (30) running the unmanned store service software, and may provide a ticket payment function using biometric information (e.g., fingerprint, iris, face, etc.). Once the ticket purchase is completed, the user may receive an information message through a messaging app (e.g., text message app, KakaoTalk, etc.).

In addition, the unmanned store service software may provide a function for the user to extend the time of the ticket or move the seat and functions to process entering, going out, and leaving, etc. Specifically, users may extend the time of the ticket they have already purchased through the unmanned store service software and pay an additional fee for the time extension, in this case, simple payments and payments using biometric information are possible. Additionally, users may choose to go out or leave through the unmanned store service software, and if an additional fee is incurred when leaving, the user can pay the additional fee through the app. In addition, it is possible to provide users with a function to search purchase history of tickets through the unmanned store service software, a function to connect to the customer center for each unmanned store, and a function to receive notification of usage status via messenger notification or text message.

As previously described, unmanned store service software may be mounted on the kiosks 20, 22. Accordingly, the kiosks 20, 22 may provide services related to the unmanned study cafe to users on site. When the unmanned store service software is executed on the kiosks 20, 22, in addition to the functions implemented in the unmanned store operation software of the user device 30 as described above, on-site card payment function for users of devices that do not run unmanned store service software (e.g., 2G phones), functions to purchase and extend tickets offline on site, and functions to process entering and leaving functions, etc. may be provided.

In relation to the entering and leaving functions, users who purchase tickets online may enter, go out, leave, etc. by scanning the ticket barcode displayed in the unmanned store service software through a barcode scanner connected to the kiosk (20, 22), and users who purchase offline tickets may enter, go out, leave, etc. using the kiosks 20, 22. As described above, tickets purchased online by the user through a mobile app may also be linked to the kiosks 20, 22, and conversely, tickets purchased on-site through the kiosks 20, 22 may also be linked to the mobile app.

Additionally, the user device 30 may run unmanned store operation software or unmanned store management software provided to store operators (store owners, franchise managers, etc.) or system managers of unmanned stores. Accordingly, store operators can operate an unmanned store from a remote location without having to reside at the unmanned store site, and system managers can maintain an unmanned store from a remote location without having to visit the unmanned store site.

For example, unmanned store operation software may implement functions that provide store management and usage status. Specifically, store managers may search the real-time usage status for seats, study rooms, and lockers and study room reservation status, and directly assign and reserve tickets for specific users. Specific details regarding the types of tickets are the same as described in the unmanned store service software. In addition, a sales status inquiry function is provided, allowing store managers to view total sales and detailed sales, for example, store operators may view total sales by ticket, detailed sales by period/ticket, etc. in tables or graphs. In addition, a cancellation/refund status inquiry function is provided, allowing store operators to view specific payment details (payment date and time, payment number, user information, seat number, ticket type, payment method, payment amount, etc.) and cancel/refund specific payment.

In addition, a ticket management function is provided, so store operators may set promotions to be applied to tickets, cancel applied promotions, and set different promotional details for each ticket. In addition, a user management function is provided, so store operators may view basic information (e.g., mobile phone number, name, date of birth, gender, parents' mobile phone number, join date, etc.) and store usage status (e.g. cumulative payment amount, number of non-payments, number of automatic leavings, usage status, etc.) for each user. In addition, the store operator may change the user's parent contact information, change the usage status to in use/suspended, and enter a reason when suspending use. Users who are suspended cannot use the unmanned store, and the reason for suspension entered by the operator may be checked through the unmanned store service software. In addition, the store operator may check the details of all tickets used in the store by user through the unmanned store operation server, and check the time change, ticket status change (e.g. entering, going out, leaving, moving seats, extending time, exceeding going out time, etc.), seat, and used device (e.g., whether it is a user device or a kiosk) for each ticket.

In addition, store operator information (e.g., ID, name, email address, contact information), store information (e.g., store name, business registration number, blog address, homepage address, opening date, region, store address, store-related photos, store operating hours, etc.), store operation information, store ticket operation information, and store IoT control management functions are provided, store operator information and store information may be viewed and changed, store non-operating hours (e.g., 24-hour operation, start time to end time, regular closure) may be set for each day of the week, and holidays may be set separately for each day. In addition, the store operator may view and change store operation information (for example, Kakao Plus channel search ID, chat URL, Wi-Fi name, Wi-Fi password, precautions, available gender, kiosk seating map enlargement ratio, locker password, light bulb control availability, HUE bridge list, basic light bulb color etc).

In addition, store operator may view and change store ticket operation information (e.g., double check in, pre-entry with time ticket, settlement of excess fee upon check out, grace period for leaving when ticket is exceeded, time available for study room pre-booking, time flow/stop when going out with time ticket, daily outing time permitted with time ticket, outing permitted with period ticket, number of times automatic leaving is allowed, etc.), and perform IoT control such as turning on/off all light bulbs in the store, opening doors, and restarting kiosks for entering/exiting.

In addition, franchise managers are provided with a store management function for store owners, so they may check store information such as the store's region, store name, operator name, contact information, opening date, and promotion contents, as well as the status of tickets and promotions for each store. In addition, a function may be provided to check the status of tickets for each store by ticket or to check the sales status.

Below, based on the foregoing, methods for remotely managing an unmanned store using IoT technology will be explained in detail. In the following description, unmanned store service software, unmanned store operation software, or unmanned store management software may be provided through the kiosks 20, 22 and the user device 30 in conjunction with the service server 10.

Figure 2:
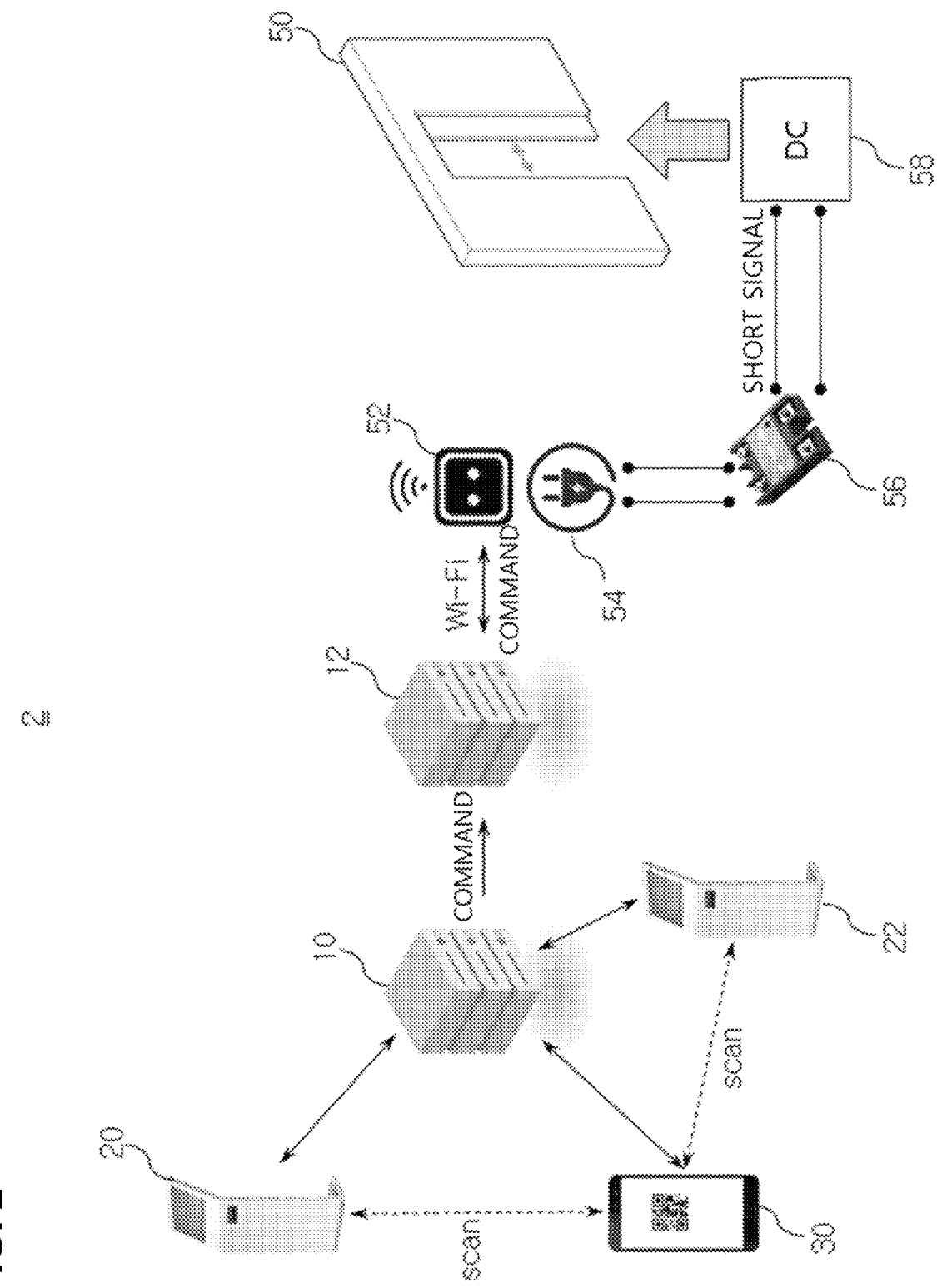
FIG. 2 illustrates a system for managing an unmanned store remotely according to an embodiment of the present invention.

FIG. 2 illustrates a system for managing an unmanned store remotely according to an embodiment of the present invention.

Referring to FIG. 2, the system for managing an unmanned store remotely 2 according to an embodiment of the present invention may include a service server 10, an Mqtt server 12, kiosks 20, 22, and a user device 30, and controlling a door 50 may be performed using a smart plug 52, an adapter 54, a solid state relay (or semiconductor relay, semiconductor-type relay) 56, and a deadbolt 58.

The service server 10 may provide a door opening signal for opening the door 50 to the Mqtt server 12. When the service server 10 provides a door opening signal to the Mqtt server 12 may correspond to, for example, when a user enters, goes out, or leaves while holding a valid ticket, or when the store operator needs to open the door 50 directly as needed. In this case, in response to a door opening request provided from the unmanned store service software or unmanned store operation software running through the kiosks 20, 22 or the user device 30, the service server 10 may generate a door opening signal and provide it to the Mqtt server 12.

For example, when a user purchases a valid ticket and makes a request to enter, go out, leave, etc. through the unmanned store service software by scanning the valid ticket through the barcode scanner of the kiosks 20, 22, the service server 10 may provide a door opening signal to the Mqtt server 12. In addition, even when a user requests entering, going out, exiting, etc. with a valid ticket through the unmanned store service software on the user device 30, the service server 10 may provide a door opening signal to the Mqtt server 12. In addition, when the user requests the store operator to open the door, the store operator may execute the door opening function through the unmanned store operation software on the user device 30, and even in this case, the service server 10 may provide a door opening signal to the Mqtt server 12.

The Mqtt server 12, which has received the door opening signal, can control the smart plug 52 connected to the Mqtt server 12 via a Wi-Fi network to be in the ON state. When the smart plug 52 is in the ON state, power may also be supplied to the adapter 54 connected to the smart plug 52, and then power may also be supplied to the solid state relay 56. Then, the solid state relay 56 provides a short signal to the deadbolt 58, and the door 50 is opened accordingly.

In particular, the Mqtt server 12 may control the smart plug 52 to be in the ON state only for a predetermined time (for example, about 1 second). In other words, the Mqtt server 12 may control the smart plug 52 to be in the ON state, and then control the smart plug 52 to be in the OFF state again after a predetermined time.

Accordingly, as the smart plug 52 turns ON and then turns OFF, power may be supplied to the adapter 54 connected to the smart plug 52 and then cut off, and then power may also be supplied to the solid state relay 56 and then cut off. Then, the solid state relay 56 provides the short signal to the deadbolt 58 and then stops providing the short signal, and the door 50 is opened only while the short signal is applied, so accordingly the door 50 is opened and then closed.

Here, the time it takes for the door 50 to open and close may be longer than the time it takes for the smart plug 52 to turn from ON to OFF. Specifically, the time it takes for the door 50 to open and close may vary depending on how the current value is set when power is supplied to and then cut off from the solid state relay 56, for example, when the adapter 54 is an adapter with a standard of 12V/1A, if the time it takes for the smart plug 52 to turn from ON to OFF is about 1 second, the time it takes for the door 50 to open and close may be about 3 to 5 seconds. However, the time it takes for the door 50 to open and close, or the time it takes for the smart plug 52 to turn from ON to OFF can be changed to other values depending on the needs of store operation.

Meanwhile, the smart plug 52 may be connected to a Wi-Fi network and communicate with the Mqtt server 12, and the smart plug 52 may detect whether it is connected to the Wi-Fi network. In addition, the smart plug 52 may be equipped with a control code (or control program, control software) that controls the smart plug 52, by customizing the control code, when the smart plug 52 detects that the connection to the Wi-Fi network has been lost, power may be automatically provided to the adapter 54 to open the door 50. Additionally, the smart plug 52 continues to provide power to the adapter 54 while the connection to the Wi-Fi network is lost to keep the door 50 open, and when it is reconnected to the Wi-Fi network, the smart plug 52 may control the door 50 to be closed by cutting off the power provided to the adapter 54.

Meanwhile, the door opening and closing function may also be linked to a thermal imaging camera. Specifically, the kiosks 20, 22 may include a thermal imaging camera or be linked with an external thermal imaging camera, and if the user is scanned with a thermal imaging camera and the body temperature is measured above a predetermined level, the service server 10 may transmit a door blocking command to the Mqtt server 12 and the Mqtt server 12 may control the smart plug 52 not to provide power to the adapter 54, thereby blocking the opening of the door.

More specific details about how the door opening and closing function is linked to the thermal imaging camera will be described later with reference to FIG. 17 to FIG. 22.

Figure 3:
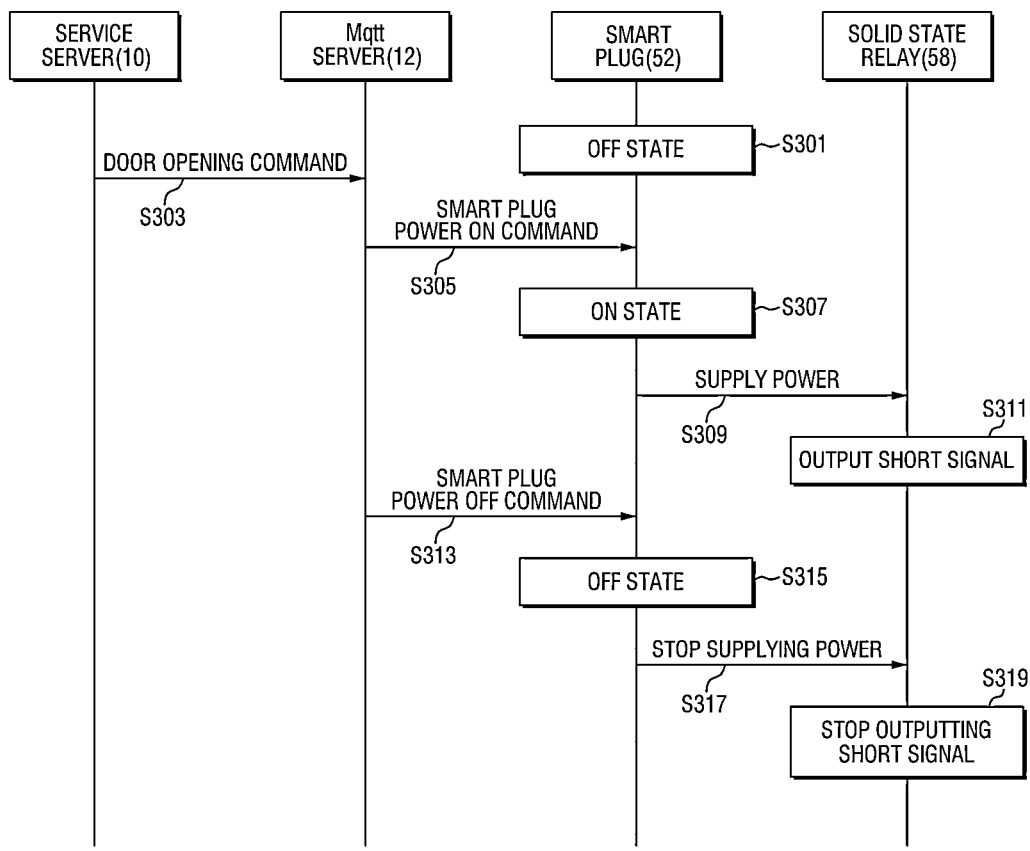
FIG. 3 is a flowchart illustrating a method for managing an unmanned store remotely according to an embodiment of the present invention.

FIG. 3 is a flowchart illustrating a method for managing an unmanned store remotely according to an embodiment of the present invention.

Referring to FIG. 3, a method for managing an unmanned store remotely may include, switching the smart plug 52 to the OFF state (S301), the service server 10 transmitting a door opening command to the Mqtt server 12 (S303), the Mqtt server 12 transmitting a smart plug power ON command to the smart plug 52 (S305), switching the smart plug 52 to the ON state (S307), the smart plug 52 supplying power to the solid state relay 58 (S309), and the solid state relay 58 outputting a short signal (S311), and through these steps, the door 50 may be opened.

In addition, the method may include, the Mqtt server 12 transmitting a smart plug power OFF command to the smart plug 52 (S313), switching the smart plug 52 to the OFF state (S315), stopping the smart plug 52 from supplying power to the solid state relay 58 (S317) and stopping the solid state relay 58 from outputting a short signal (S319), and through these steps, the door 50 may be closed.

Figure 4:
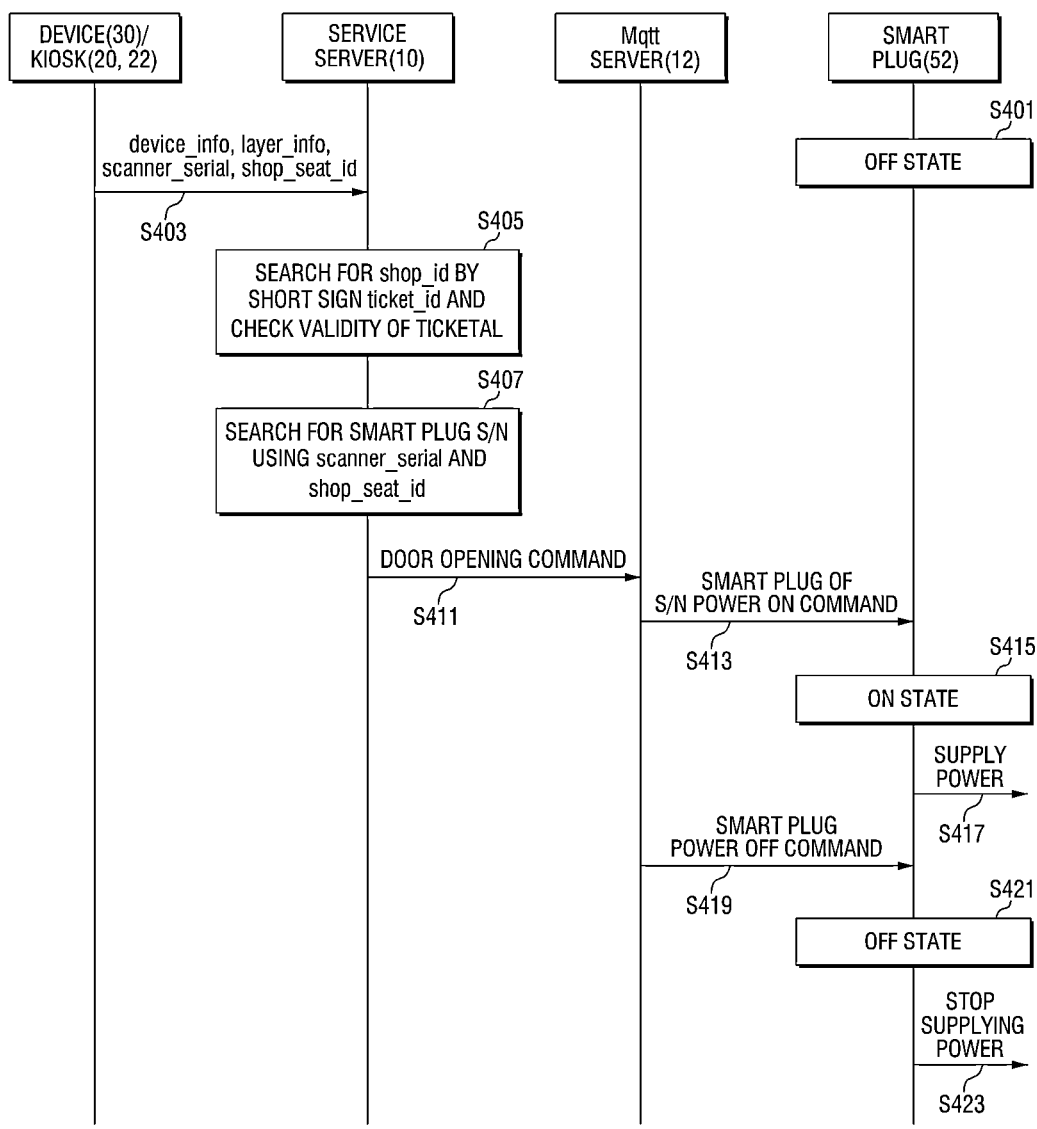
FIG. 4 is a flowchart illustrating a method for managing an unmanned store remotely according to an embodiment of the present invention.

FIG. 4 is a flowchart illustrating a method for managing an unmanned store remotely according to an embodiment of the present invention.

Referring to FIG. 4, a method for managing an unmanned store remotely may include, switching the smart plug 52 to the OFF state (S401), the user device 30 or the kiosks 20, 22 providing device_info, layer_info, ticket_id, scanner_serial, and shop_seat_id to the service server 10 (S403), the service server 10 searching for shop_id by ticket_id and checking the validity of the ticket (S405), the service server 10 searching for the serial number (S/N) of the smart plug that controls the door to be opened using scanner_serial and shop_seat_id (S407).

In this embodiment, ticket_id is a ticket identifier for identifying the ticket, device_info is the identifier of the device that received the request signal, such as shop_in (kiosk for entering the store), shop_out (kiosk for leaving the store), and study-room (study room), shop_id is a store identifier to identify the store, shop_seat_id is an identifier for a seat to be used or a seat in use, layer_info is information on the floor where the kiosk is located, and scanner_serial is the serial number (S/N) of the scanner mounted on the kiosk, the searching in steps S405 and S407 may be performed on a database that stores and manages the above information. For example, serial numbers (S/N) of smart plugs may be stored and managed for each shop_id in the database.

In addition, the method may include, the service server 10 transmitting a door opening command to the Mqtt server 12 based on the serial number (S/N) of the smart plug that controls the door to be opened (S411), the Mqtt server 12 transmitting a smart plug power ON command corresponding to the serial number (S/N) to the smart plug 52 (S413), switching the smart plug 52 to the ON state (S415), and the smart plug 52 supplying power to the solid state relay 58 (S417), and through these steps, only the door to be opened may be opened among the plurality of doors.

In addition, the method may include, the Mqtt server 12 transmitting a smart plug power OFF command to the smart plug 52 (S419), switching the smart plug 52 to the OFF state (S421), the smart plug 52. It may include a step (S423) of stopping the power supply to the solid state relay 58, and through these steps, doors that were open may be closed.

Figure 5:
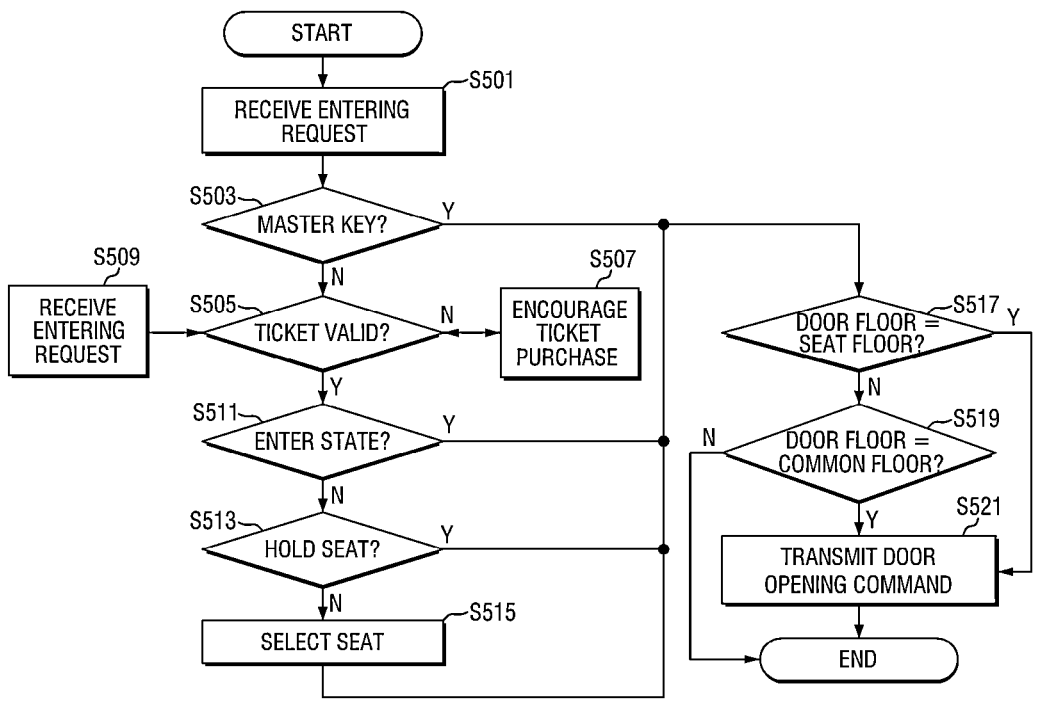
FIG. 5 is a flowchart illustrating a method for managing an unmanned store remotely according to an embodiment of the present invention.

FIG. 5 is a flowchart illustrating a method for managing an unmanned store remotely according to an embodiment of the present invention.

Referring to FIG. 5, a method for managing an unmanned store remotely may include, receiving a request for entering from a user (S501) and determining whether the request for entering originates from a master key (S503).

If it is determined that the request for entering does not originate from the master key (S503, N) or as the next step of receiving the request for entering without checking the master key (S509), the method may proceed to determining whether the user's ticket is valid (S505). If the ticket is determined to be invalid (S505, N), the method may perform encouraging the user to purchasing a ticket (S507).

If it is determined that the user's ticket is valid (S505, Y), the method may proceed to determining whether the user's ticket is in enter state or go out state (S511).

If it is determined that the ticket is not in enter state (S511, N), the method may proceed to determining whether the user holds a seat (S513). If it is determined that the user does not hold a seat (S513, N), the method may proceed to making the user to select a seat (S515).

If it is determined that the request for entering originated from the master key (S503, Y), if it is determined that the ticket is in enter state (S511, Y), if it is determined that the user holds a seat, or as the next step of making the user to select a seat (S515), the method may proceed to determining whether the door floor and the seat floor are the same (S517).

If it is determined that the door floor and the seat floor are not the same (S517, N), the method may proceed to determining whether the door floor and the common floor are the same (S519).

If it is determined that the door floor and the seat floor are the same (S517, Y) or if it is determined that the door floor and the common floor are the same (S519, Y), the method may proceed to transmitting a door opening command (S521).

Figure 6:
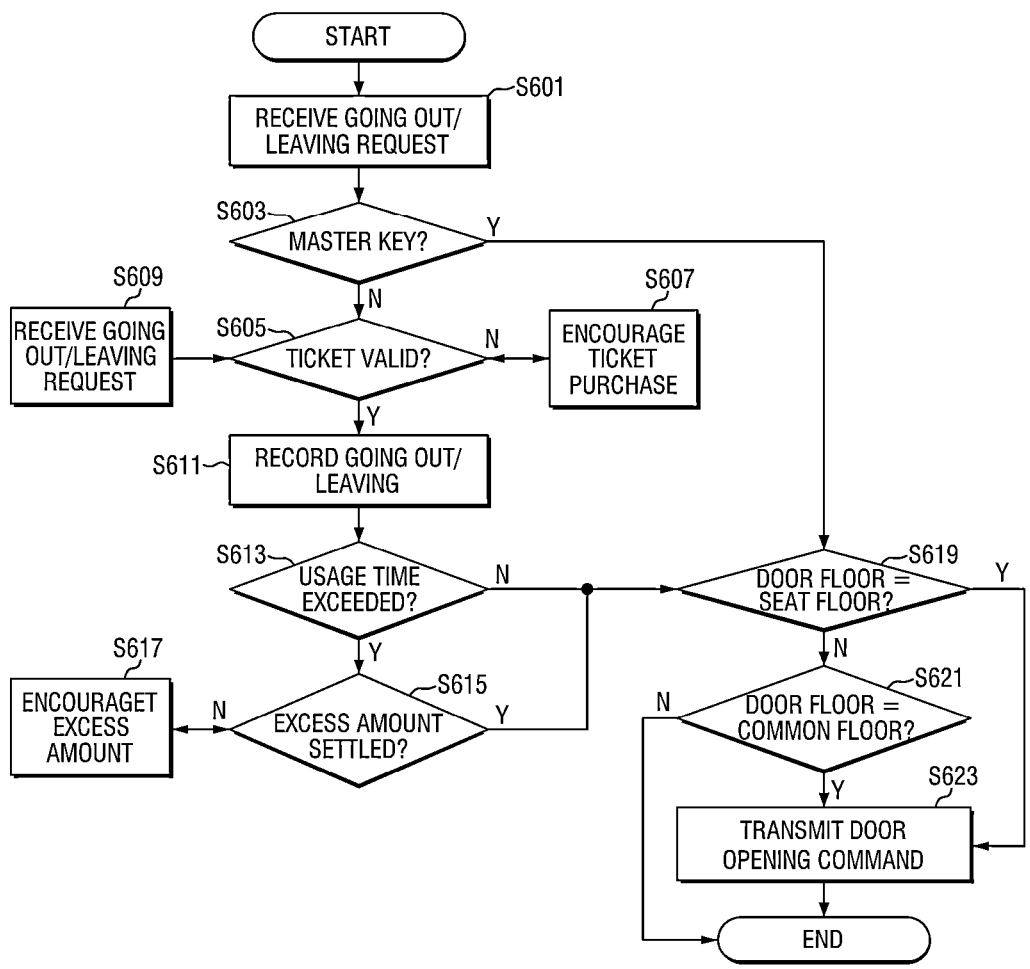
FIG. 6 is a flowchart illustrating a method for managing an unmanned store remotely according to an embodiment of the present invention.

FIG. 6 is a flowchart illustrating a method for managing an unmanned store remotely according to an embodiment of the present invention.

Referring to FIG. 6, a method for managing an unmanned store remotely may include, receiving a request for going out/leaving from a user (S601) and determining whether the request for going out/leaving comes from a master key (S603).

If it is determined that the request for going out/leaving does not originate from the master key (S603, N) or as the next step of receiving the request for going out/leaving without checking the master key (S609), the method may proceed to determining whether the user's ticket is valid (S605). If the ticket is determined to be invalid (S605, N), the method may perform encouraging the user to purchasing a ticket (S607).

If it is determined that the user's ticket is valid (S605, Y), the method may proceed to recording whether the user goes out or leaves (S611) and determining whether the usage time has been exceeded (S613). If it is determined that the usage time has been exceeded (S613, Y), the method may proceed to determining whether the excess amount has been settled (S615). If it is determined that the excess amount has not been settled (S615, N), the method may perform encouraging the user to settle the excess amount (S617).

If it is determined that the request for going out/leaving originated from the master key (S603, Y), if it is determined that the usage time has not been exceeded (S613, Y), if it is determined that the excess amount has been settled (S615, Y), the method may proceed to determining whether the door floor and the seat floor are the same (S619).

If it is determined that the door floor and the seat floor are not the same (S619, N), the method may proceed to determining whether the door floor and the common floor are the same (S621).

If it is determined that the door floor and the seat floor are the same (S619, Y) or if it is determined that the door floor and the common floor are the same (S621, Y), the method may proceed to transmitting a door opening command (S623).

Figure 7:
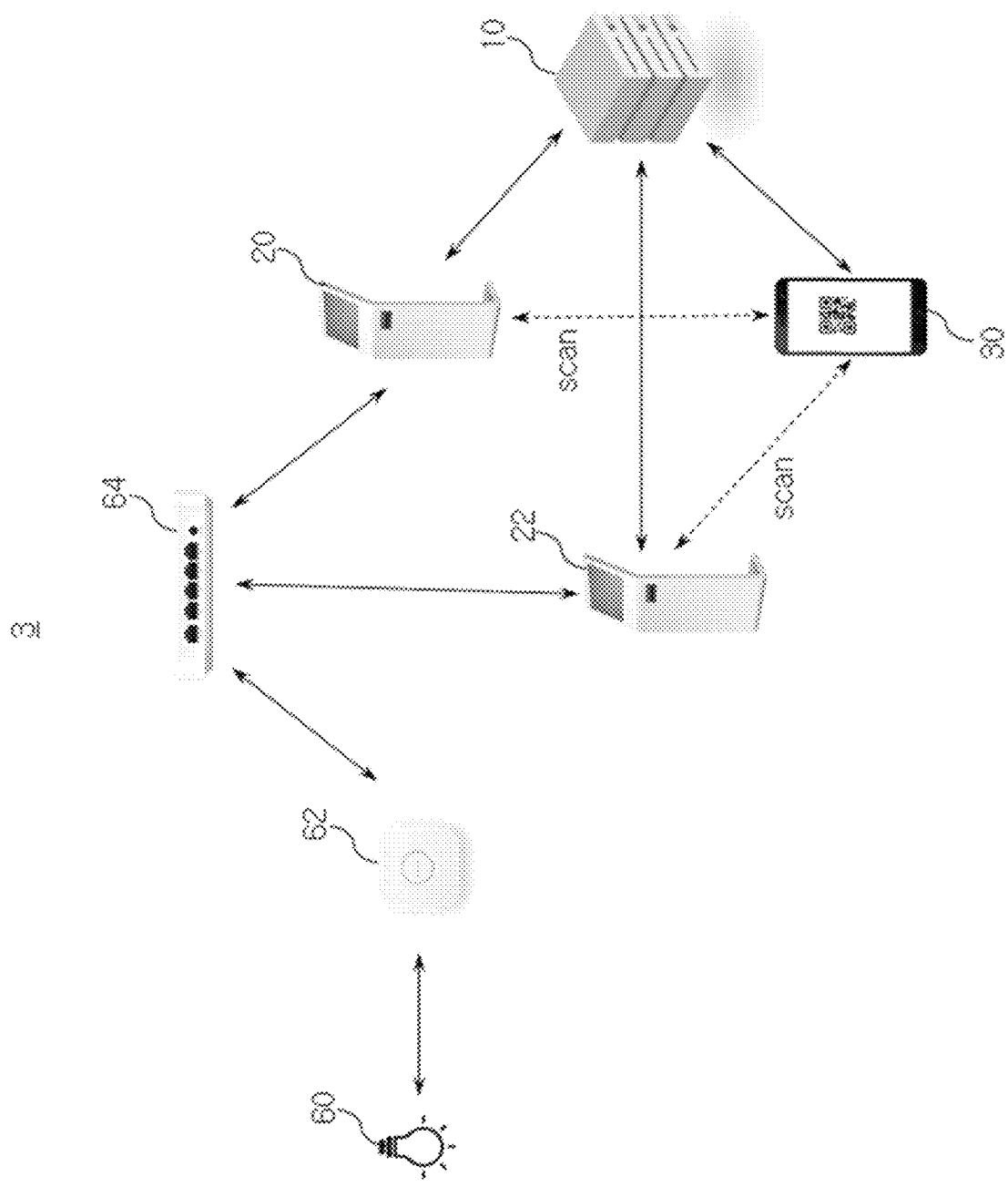
FIG. 7 illustrates a system for managing an unmanned store remotely according to an embodiment of the present invention.

FIG. 7 illustrates a system for managing an unmanned store remotely according to an embodiment of the present invention.

Referring to FIG. 7, the system for managing an unmanned store remotely 3 according to an embodiment of the present invention may include a service server 10, kiosks 20, 22, and a user device 30, and perform lighting control using a smart light bulb 60, a smart light bulb dedicated bridge 62, and a Wi-Fi router 64. Here, the kiosks 20, 22 and the smart light bulb dedicated bridge 62 are configured in the same bandwidth network through the Wi-Fi router 64. By setting the kiosks 20, 22 and the smart light bulb dedicated bridge 62 to a network of the same bandwidth, remote control of the smart light bulb 60 is possible.

The service server 10 may provide a lighting control signal to the kiosks 20, 22. Here, the lighting control signal may be used not only for ON/OFF control of the smart bulb 60, but also for color control and brightness control, and be used not only for control of a single light bulb but also for control of a plurality of light bulbs.

For example, when a user requests to enter, go out, leave, etc. through the unmanned store service software of the kiosks 20, 22 or the user device 30, or when the operator executes a lighting control function, the service server 10 may transmit a lighting control signal to the kiosk 20, 22. The kiosk 20, 22 may be implemented as an Android tablet computer, and may control the lighting by controlling the smart bulb 60 by controlling the smart light bulb dedicated bridge 62 through fcm/socket communication according to the lighting control signal.

Additionally, the user's settings for the smart light bulb 60 may be stored in the customer database. The customer database may be implemented to be connected to the service server 10, the kiosks 20, 22, and the user device 30 through a network. If the user enters later, the setting value may be read from the customer database, and the smart light bulb 60 may be controlled according to the setting value stored in the customer database. Accordingly, when the user goes to another store, the settings of the smart light bulb 60 used in the previous store may be applied to another store. Additionally, the settings of the smart light bulb 60 that the user changes or newly sets while using the unmanned store may be updated in the customer database. In addition, it is possible to control lights such as automatically turning on the lights when the user enters and automatically turning off the lights when the ticket time expires.

Figure 8:
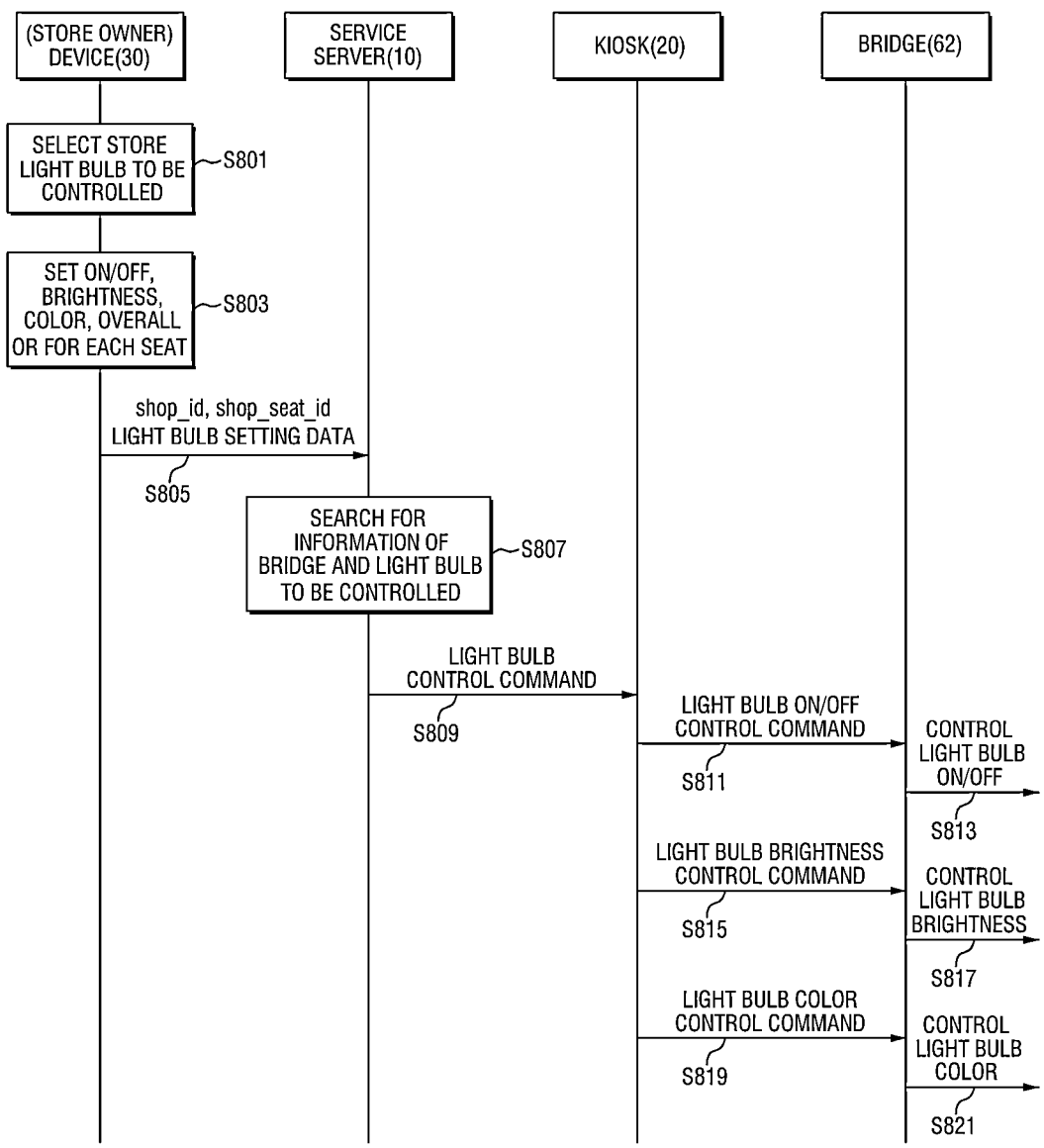
FIG. 8 is a flowchart illustrating a method for managing an unmanned store remotely according to an embodiment of the present invention.

FIG. 8 is a flowchart illustrating a method for managing an unmanned store remotely according to an embodiment of the present invention.

Referring to FIG. 8, a method for managing an unmanned store remotely may include, the user device 30 (particularly, a store operator device) selecting a store for which a light bulb is to be controlled (S801), the user device 30 setting ON/OFF, brightness, color, etc. of the light bulbs, overall or for each seat (S803), the user device 30 transmitting shop_id, shop_seat_id, and light bulb setting data to the service server 10 (S805), and the service server 10 searching for bridge and light bulb information to be controlled (S807).

In this embodiment, shop_id refers to a store identifier for identifying the store, shop_seat_id refers to an identifier for a seat to be used or a seat in use, and the searching in step S807 may be performed on a database that stores and manages the relevant information.

In addition, the method may include, the service server 10 transmitting a light bulb control command to the kiosk 20 (S809), and the kiosk 20 transmitting a light bulb ON/OFF control command to the bridge 62 (S811), and the bridge 62 performing light bulb ON/OFF control (S813).

In addition, the method may include, the kiosk 20 transmitting a light bulb brightness control command to the bridge 62 (S815) and the bridge 62 performing light bulb brightness control (S817).

In addition, the method may include, the kiosk 20 transmitting a light bulb color control command to the bridge 62 (S819) and the bridge 62 performing light bulb color control (S821).

Figure 12:
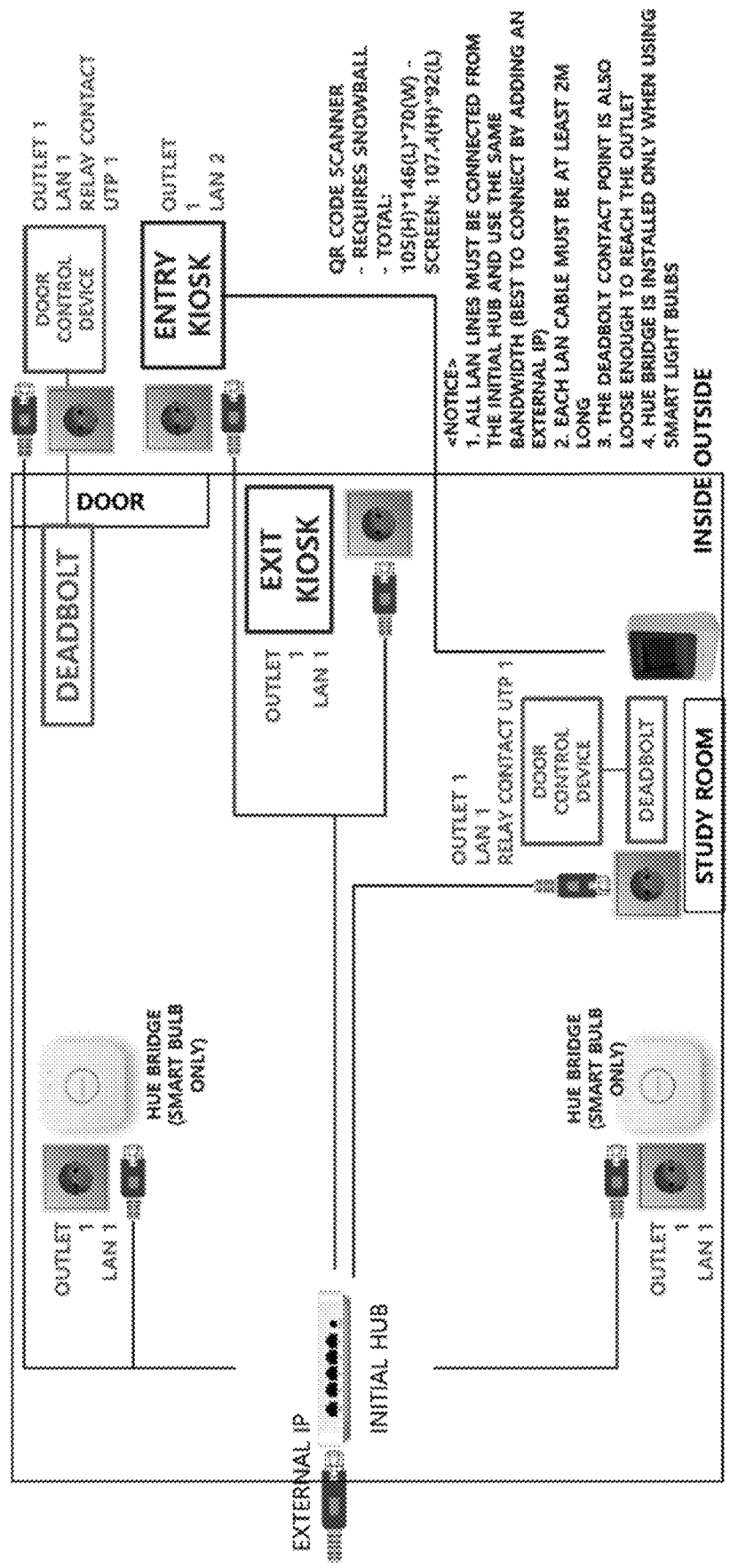
Figure 13:
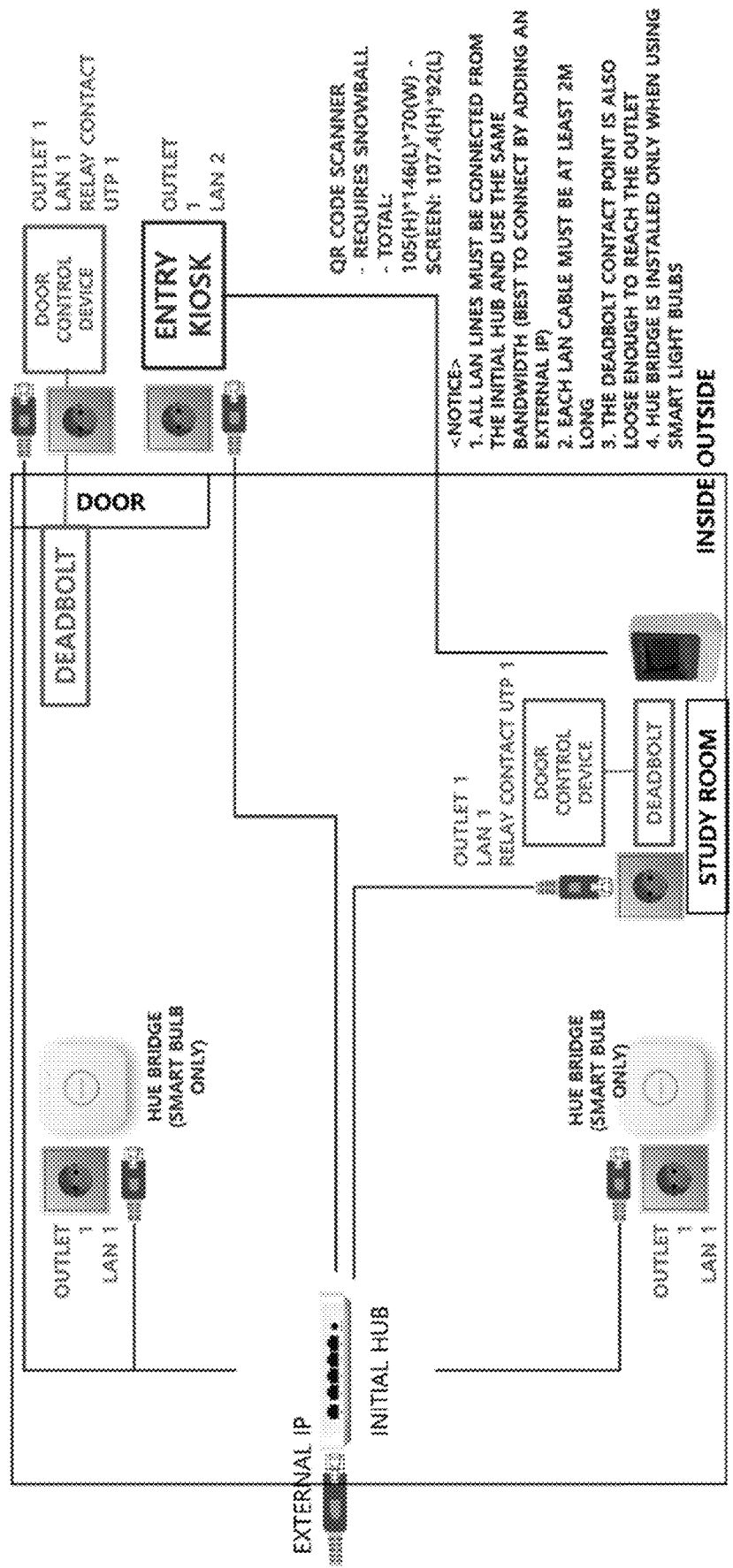
Figure 14:
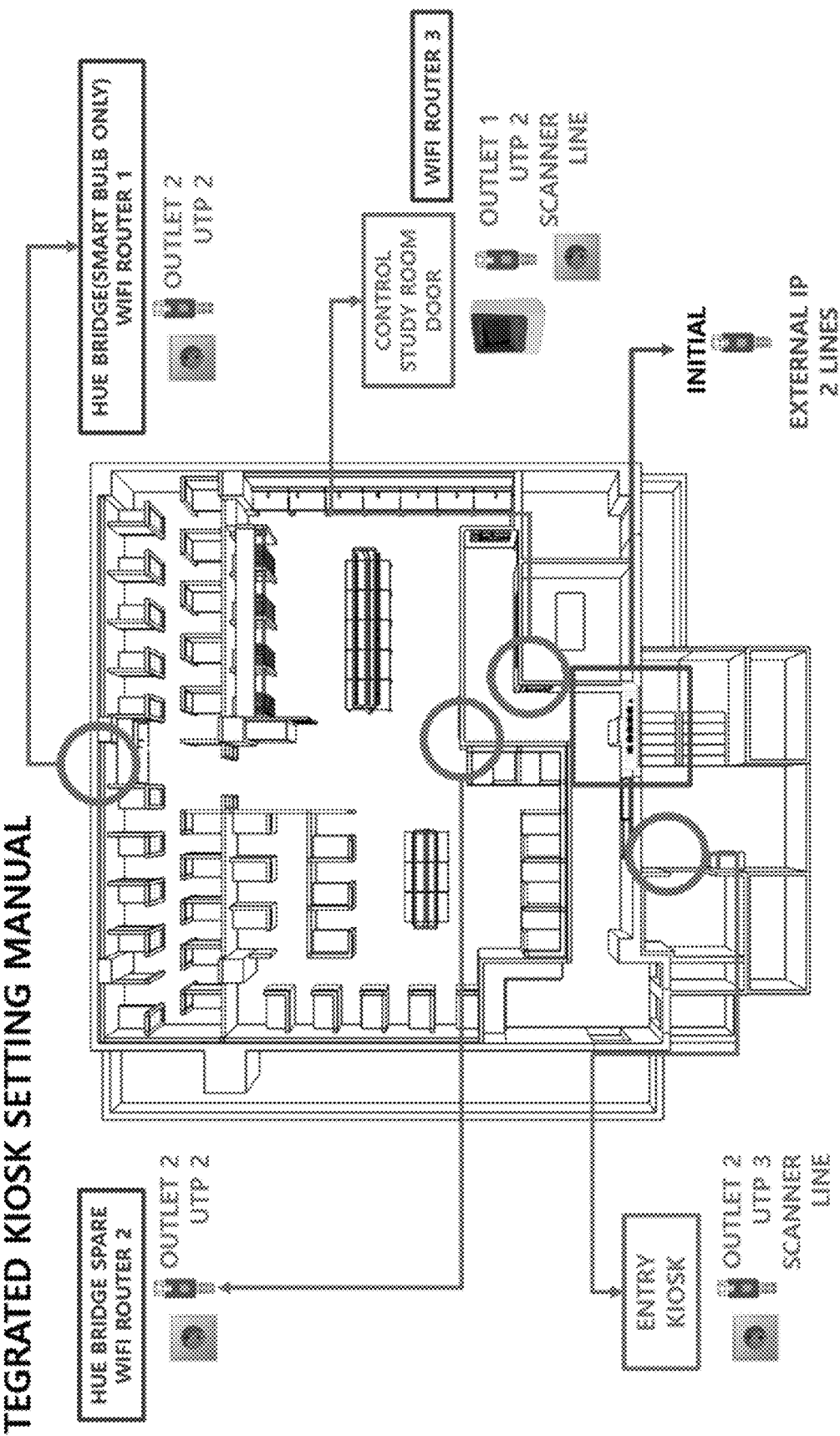

In steps S811, S815, and S819, in the case of an integrated kiosk setting as shown in FIG. 13 or FIG. 14, the entry/exit kiosk transmits light bulb control commands to the bridge 62, and in the case of a separated kiosk setting as shown in FIG. 12, the exit kiosk transmits light bulb control commands to the bridge 62. The kiosk transmitting light bulb control commands and the bridge must be using the same IP bandwidth. For example, if the kiosk's IP address is set to 192.168.50.2, the bridge's IP address may be set to 192.168.50.5 (up to 192.168.50 is the same).

Figure 9:
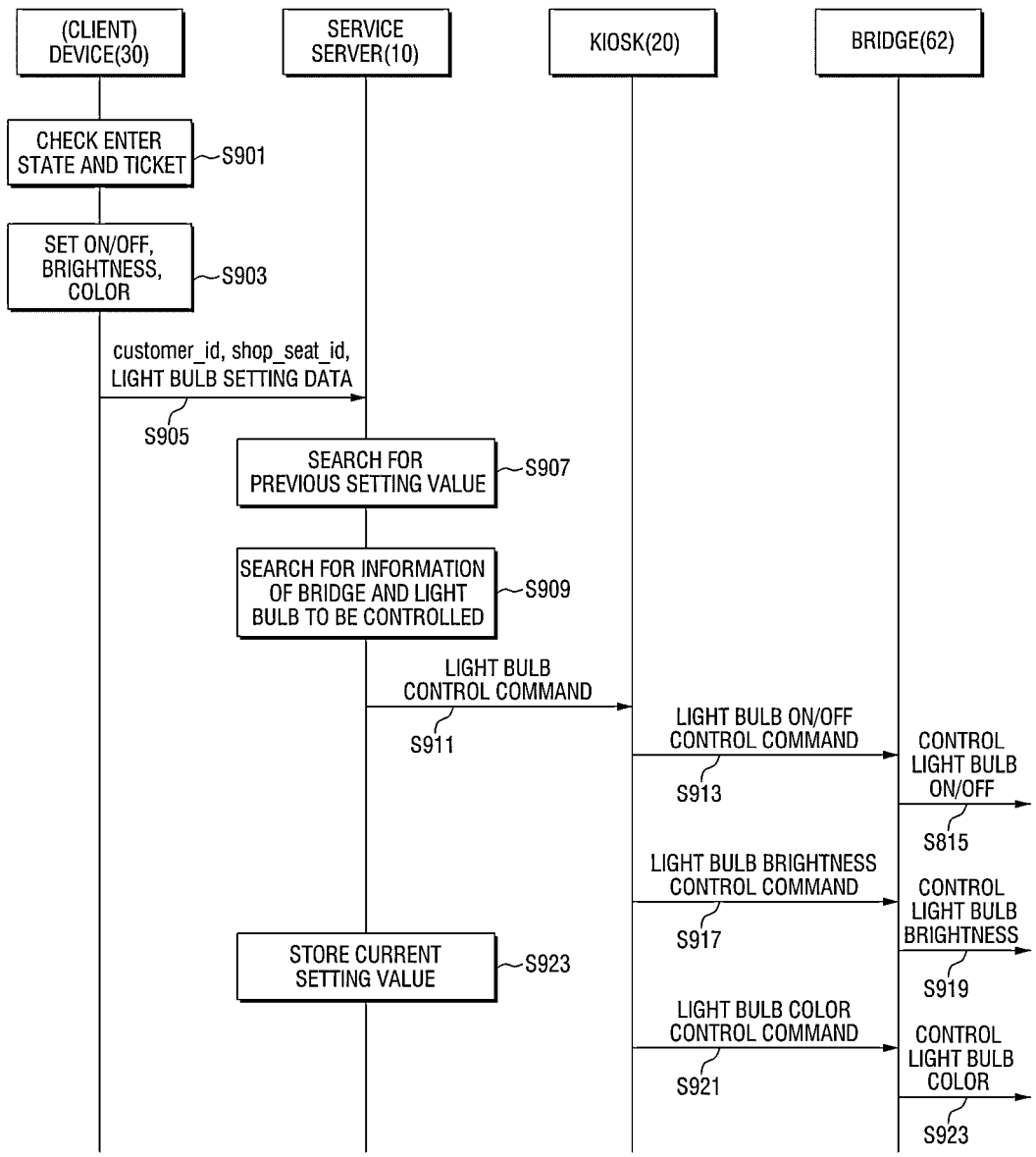
FIG. 9 is a flowchart illustrating a method for managing an unmanned store remotely according to an embodiment of the present invention.

FIG. 9 is a flowchart illustrating a method for managing an unmanned store remotely according to an embodiment of the present invention.

Referring to FIG. 8, a method for managing an unmanned store remotely may include, the user device 30 (in particular, a customer device) checking an enter state and a ticket (S901), the user device 30 setting ON/OFF, brightness, color, etc. of the light bulbs (S903), the user device 30 transmitting customer_id, shop_seat_id, and light bulb setting data to the service server 10 (S905), the service server 10 searching for the previous setting value (S907), and the service server 10 searching for bridge and light bulb information to be controlled (S909).

In this embodiment, customer_id refers to a customer identifier for identifying a customer, shop_seat_id refers to an identifier for a seat to be used or a seat in use, and the searching in steps S907 and S909 may be performed on a database that stores and manages the relevant information.

In addition, the method may include, the service server 10 transmitting a light bulb control command to the kiosk 20 (S911), and the kiosk 20 transmitting a light bulb ON/OFF control command to the bridge 62 (S913), and the bridge 62 performing light bulb ON/OFF control (S915).

In addition, the method may include, the kiosk 20 transmitting a light bulb brightness control command to the bridge 62 (S917) and the bridge 62 performing light bulb brightness control (S919).

In addition, the method may include, the kiosk 20 transmitting a light bulb color control command to the bridge 62 (S921) and the bridge 62 performing light bulb color control (S923).

In steps S913, S917, S921, in the case of an integrated kiosk setting as shown in FIG. 13 or FIG. 14, the entry/exit kiosk transmits light bulb control commands to the bridge 62, and in the case of a separated kiosk setting as shown in FIG. 12, the exit kiosk transmits light bulb control commands to the bridge 62. The kiosk transmitting light bulb control commands and the bridge must be using the same IP bandwidth. For example, if the kiosk's IP address is set to 192.168.50.2, the bridge's IP address may be set to 192.168.50.5 (up to 192.168.50 is the same).

Additionally, the method may include the service server 10 searching for the current setting value (S925).

Figure 10:
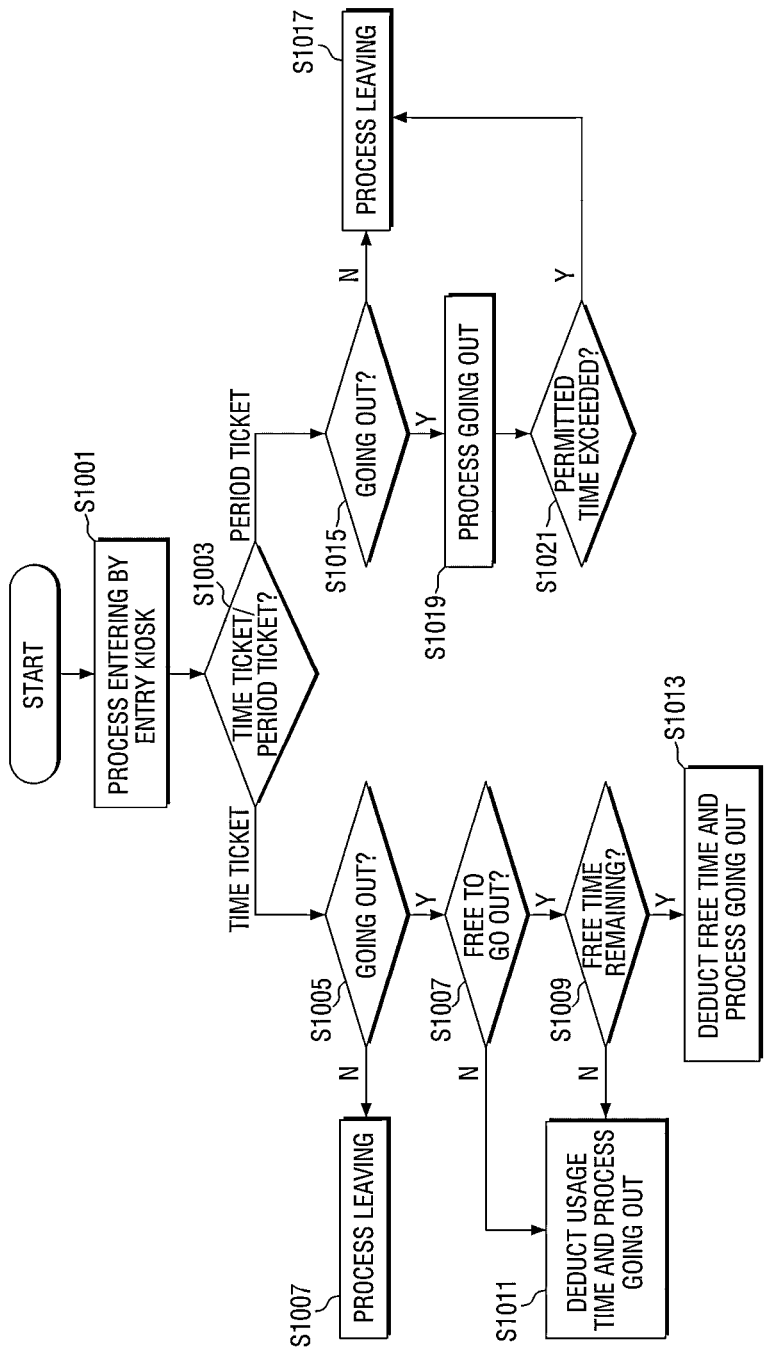
FIG. 10 is a flowchart illustrating a method for managing an unmanned store remotely according to an embodiment of the present invention.

FIG. 10 is a flowchart illustrating a method for managing an unmanned store remotely according to an embodiment of the present invention.

Referring to FIG. 10, a method for managing an unmanned store remotely may include, the enter kiosk processing entering (S1001) and determining whether it is a time ticket or a period ticket (S1003).

If it is determined that it is a time ticket, the method may proceed to determining whether the user is going out (S1005), and if it is determined that the user is not going out (S1005, N), the method may proceed to processing leaving (S1007), if it is determined that the user is going out (S1005, Y), the method may proceed to determining whether it is free to go out (S1009).

If it is determined that it is free to go out (S1007, Y), the method may proceed to determining whether there is free time remaining (S1009). If it is determined that there is free time remaining (S1009, Y), the method may proceed to deducting free time and processing going out (S1013), and if it is determined that it is not free to go out (S1007, N) or if it is determined that there is no free time remaining (S1009, N), the method may proceed to deducting the usage time and processing going out (S1011).

On the other hand, if it is determined that it is a period ticket, the method may proceed to determining whether the user is going out (S1015), and if it is determined that the user is not going out (S1015, N), the method may proceed to processing leaving (S1017), if it is determined that the user is going out (S1015, Y), the method may proceed to processing going out (S1019).

After going out is processed, determining whether the permitted time to go out has been exceeded (S1021) may be performed, and if it is determined that the permitted time to go out has been exceeded (S1021, Y), the method may proceed to processing leaving (S1017). For example, in the case of a store that uses a period ticket automatic leaving function, after the user using the period ticket goes out, the server may automatically check out for the user after the time limit set for each store has passed. At this time, the time limit to go out may be initialized and calculated each time the user goes out.

FIG. 11 to FIG. 16 illustrate some implementation examples of a system for managing an unmanned store remotely according to an embodiment of the present invention.

Figure 11:
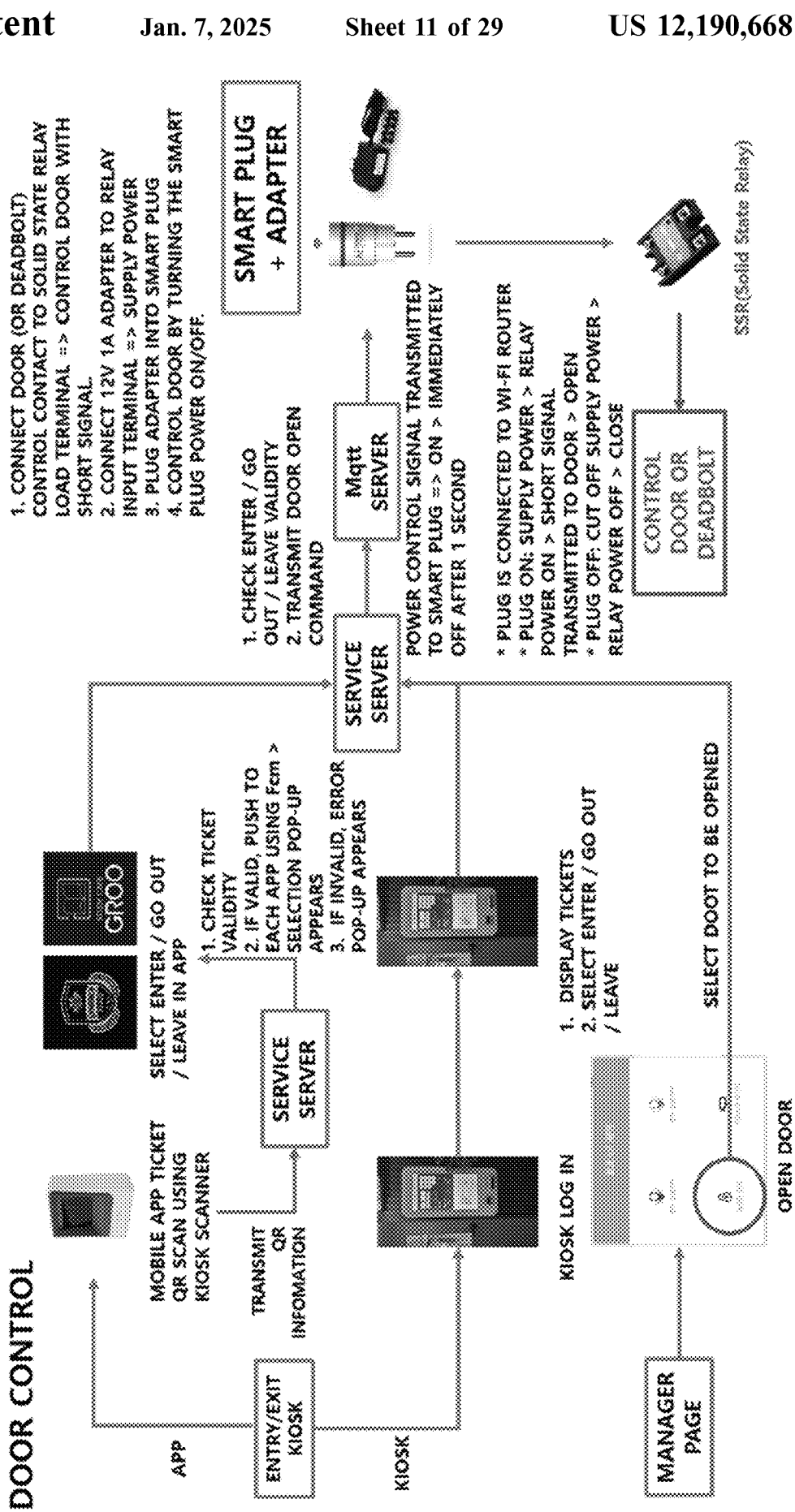
FIG. 11 to FIG. 16 illustrate some implementation examples of a system for managing an unmanned store remotely according to an embodiment of the present invention.

FIG. 11 shows an implementation example of controlling a door, FIG. 12 shows an implementation example of setting up a separated kiosk, and FIG. 13 and FIG. 14 show an implementation example of setting an integrated kiosk, but the scope of the present invention is not limited to these implementation examples.

Figure 15:
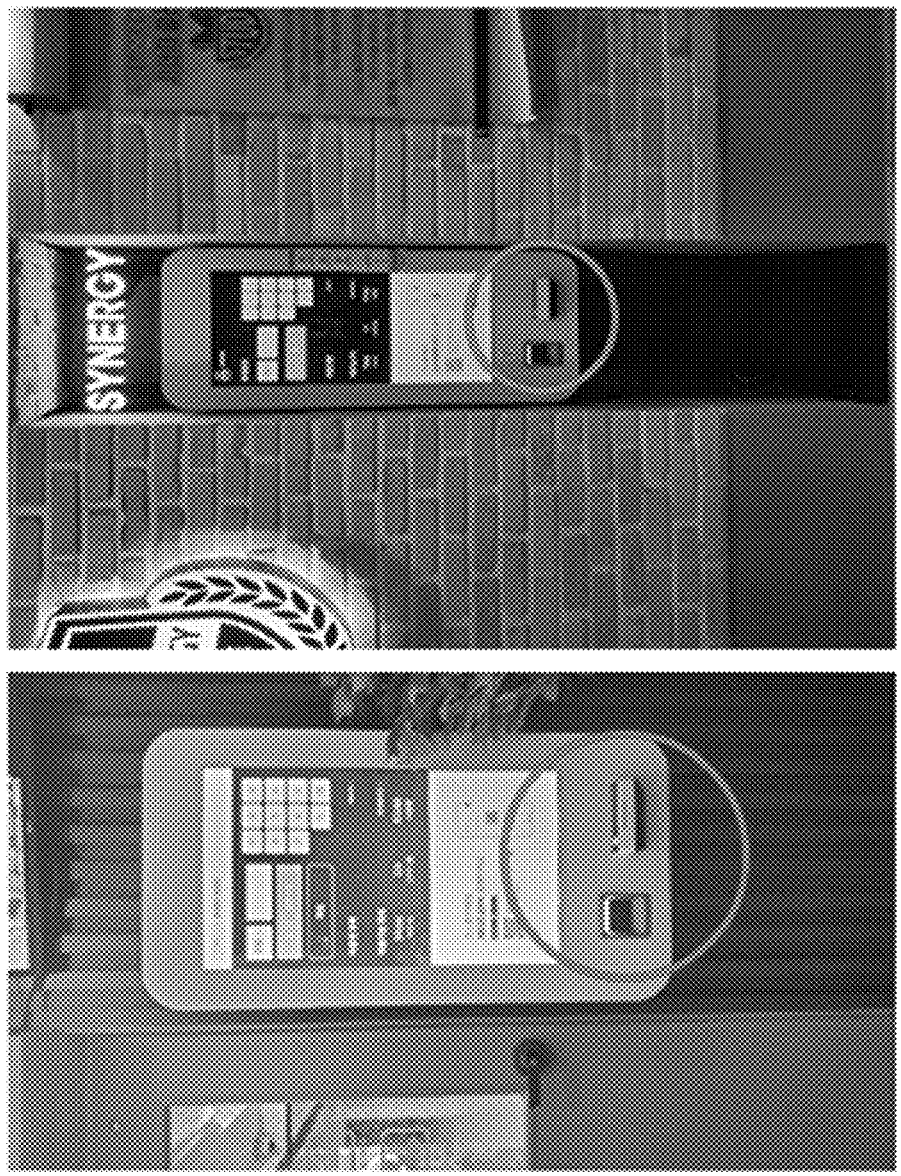
Figure 16:
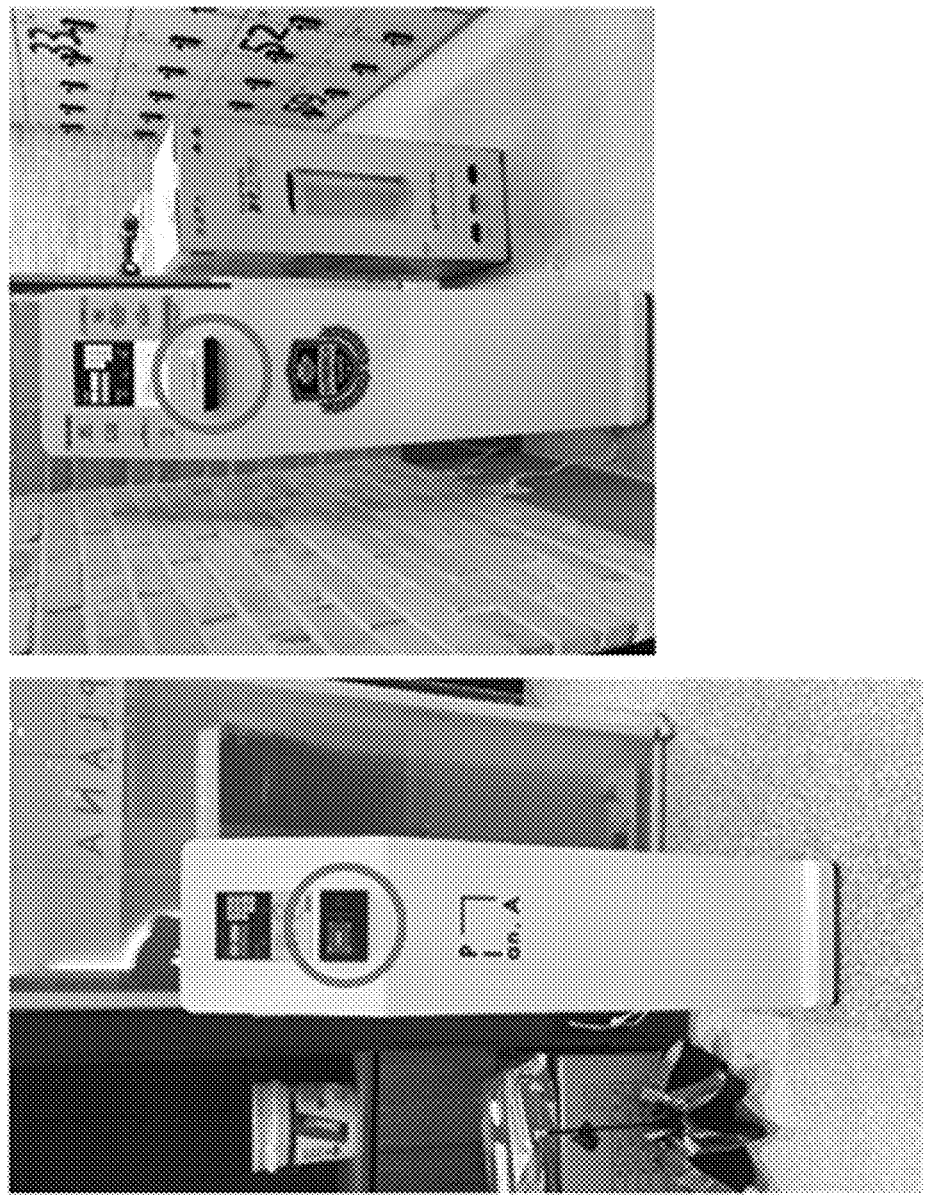

In addition, FIG. 15 and FIG. 16 show one implementation example of the kiosks 20, 22, but the scope of the present invention is not limited to these implementation examples.

FIG. 17 to FIG. 22 illustrate some implementation examples of a system for managing an unmanned store remotely, working in conjunction with a thermal imaging camera according to an embodiment of the present invention.

Figure 17:
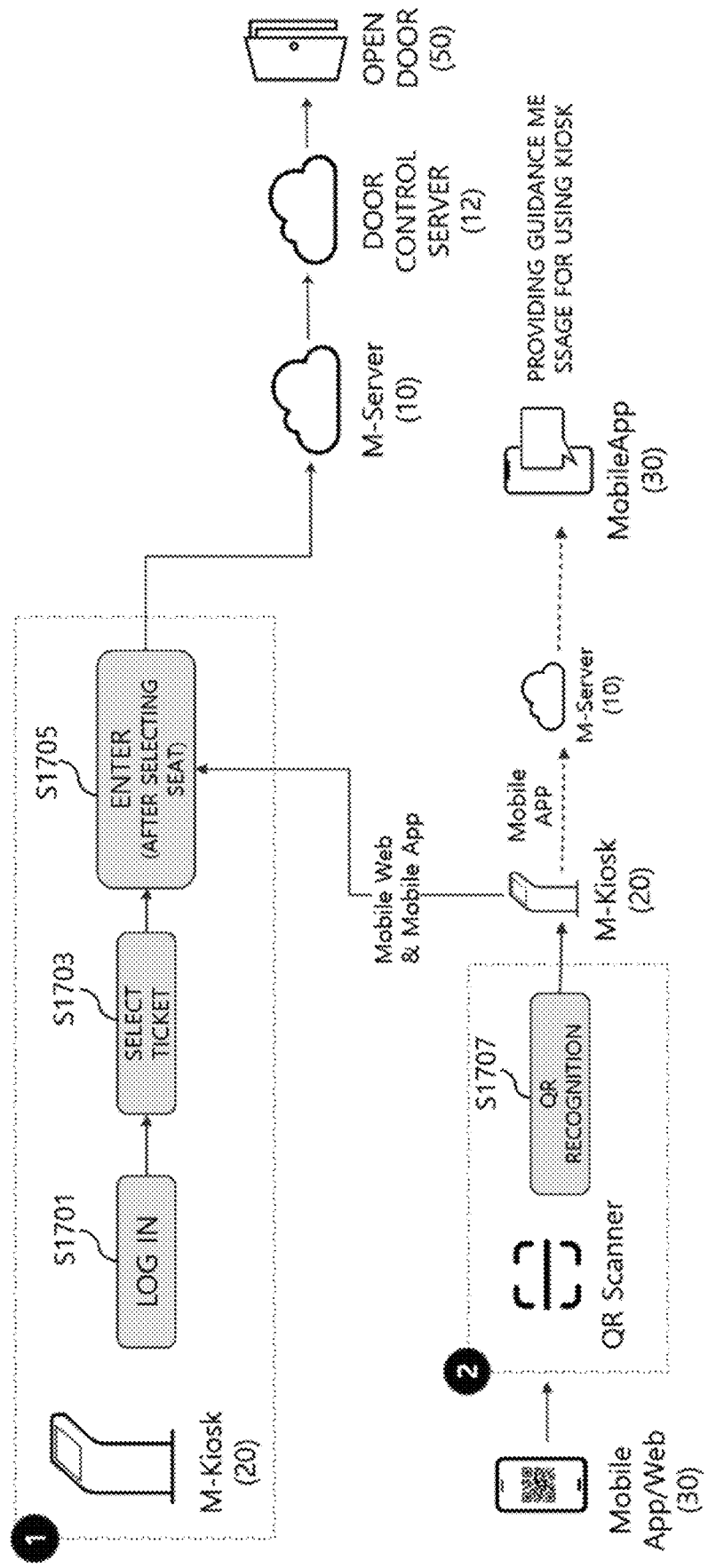
FIG. 17 to FIG. 22 illustrate some implementation examples of a system for managing an unmanned store remotely, working in conjunction with a thermal imaging camera according to an embodiment of the present invention.

Referring to FIG. 17, there are two ways to enter an unmanned store: an entry method through a kiosk (indicated by 1) and an entry method by using a QR code (indicated by 2). In the case of the entry method through a kiosk, the user may log in to the kiosk 20 (S1701), select a ticket (S1703), and select a seat and enter (S1705). Meanwhile, in the case of the entry method by using a QR code, the user may read the QR code of the device 30 with the QR scanner of the kiosk 20 for QR recognition (S1707), and select a seat and enter (S1705).

Figure 18:
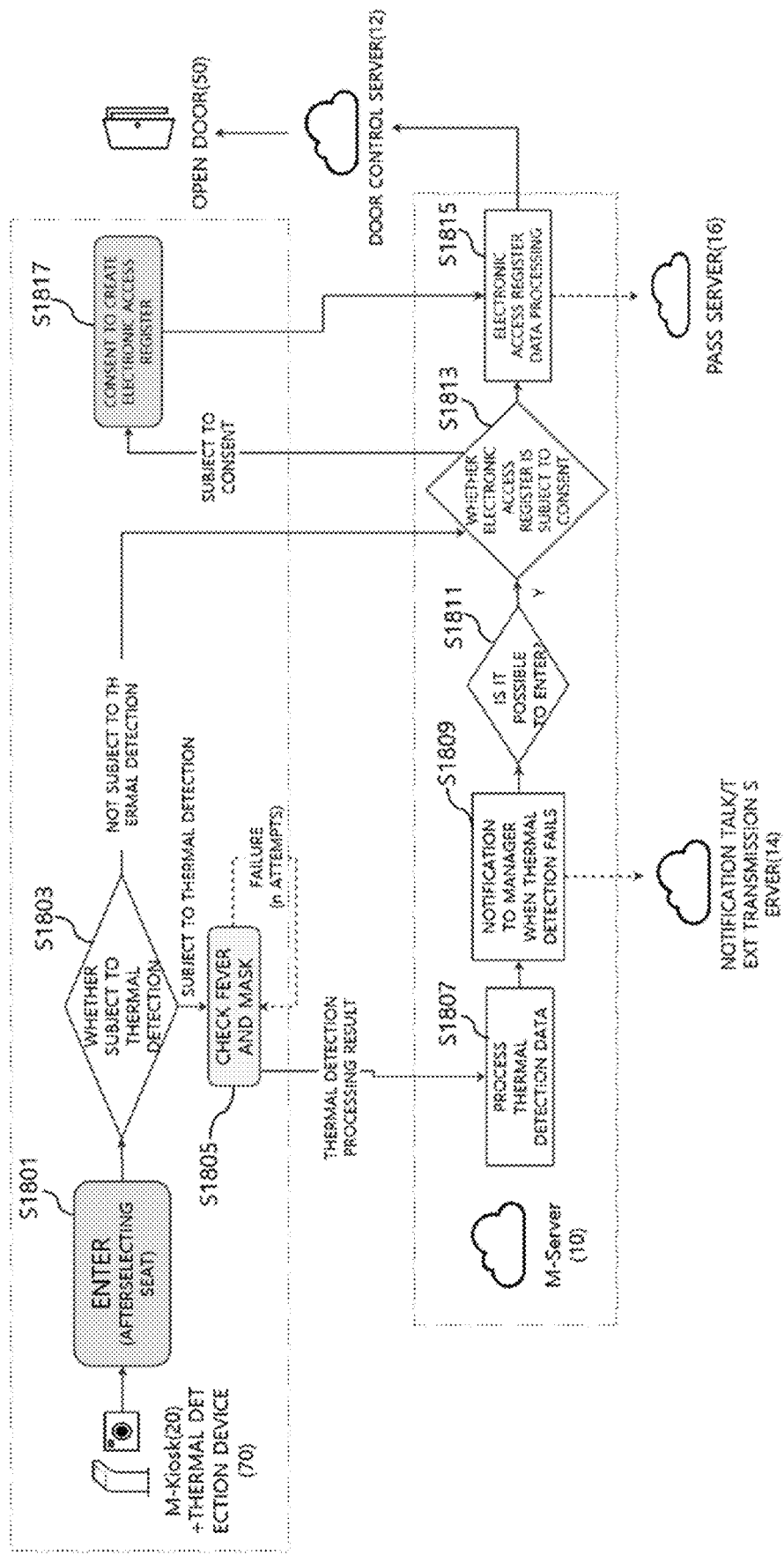

Referring to FIG. 18, when the user select a seat and enter using the kiosk 20 linked with a thermal imaging camera (or a heat detector) 70 (S1801), it is determined whether the user is subject to heat detection (S1803). If it is determined that the user is subject to heat detection, the thermal imaging camera 70 may be used to check whether the user has a fever and whether the user is wearing a mask. Here, in particular, determination of whether to wear a mask may be performed using machine learning-based image recognition technology. Next, the heat detection data may be processed (S1807), and if heat detection fails, the manager may be notified (S1809), and whether access is possible is determined (S1811), and if possible, whether the user is subject to consent to the electronic access register. Meanwhile, if it is determined that the user is not subject to heat detection, the step (S1813) may be performed.

If it is determined that the user is subject to consent to the electronic access register, consent to create the electronic access register may be received from the user, and the electronic access register data may be processed (S1815). If it is not determined that the user is subject to consent to the electronic access register, the step (S1815) may be performed immediately.

Figure 19:
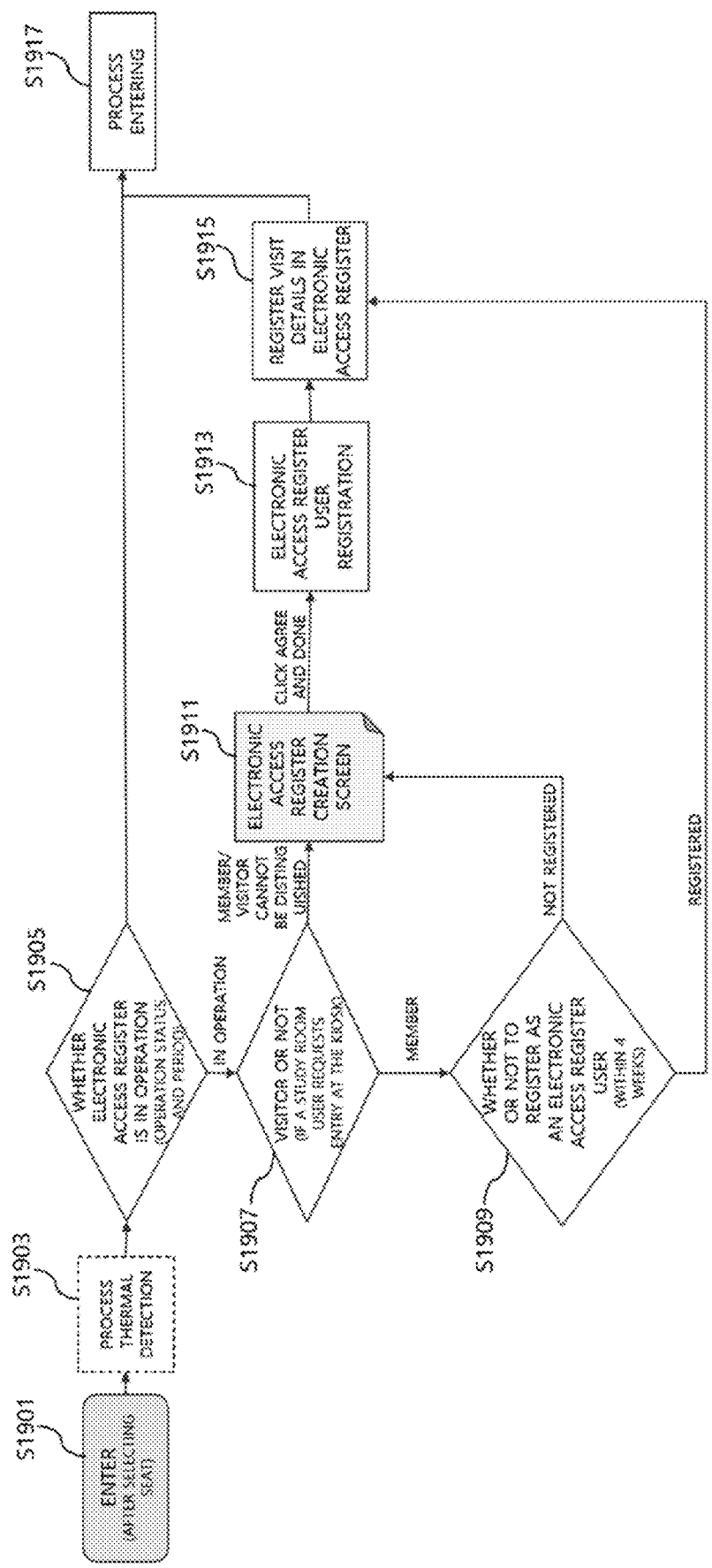

Referring to FIG. 19, when the user select a seat and enter (S1901), thermal detection processing may be performed (S1903) and it may be determined whether or not the electronic access register is in operation (S1905). If it is determined that the electronic access register is not in operation, processing entering (S1917) may be performed.

If it is determined that the electronic access register is being operated, it may be determined whether the user is a visitor (S1907). If it is determined that the user is a visitor, or if it is difficult to distinguish between a member and a visitor, the electronic access register creation screen may be displayed (S1911), and registering the user to the electronic access register (S1913) and registering electronic access register visit history (S1915) may be performed. After step (S1915), step (S1917) may be performed.

If it is determined that the user to be a member, it may be determined whether or not to register as a user of the electronic access register (S1909). If it is determined that the user is not registered as a user of the electronic access register, the step S1911 may be performed, and if it is determined that the user has been registered as a user of the electronic access register, the step S1915 may be performed.

For example, members can register their visit details in the electronic access register each time they enter (including entering after going out) by going through the user information confirmation and consent process once during a given period (for example, 4 weeks). In contrast, for users who cannot be identified as members (for example, visitors) or when multiple people use one ticket, such as a study room, an electronic access register must be created each time the user enters. If an unmanned store user refuses to participate in the electronic access register, he or she may be prevented from using the unmanned store.

Figure 20:
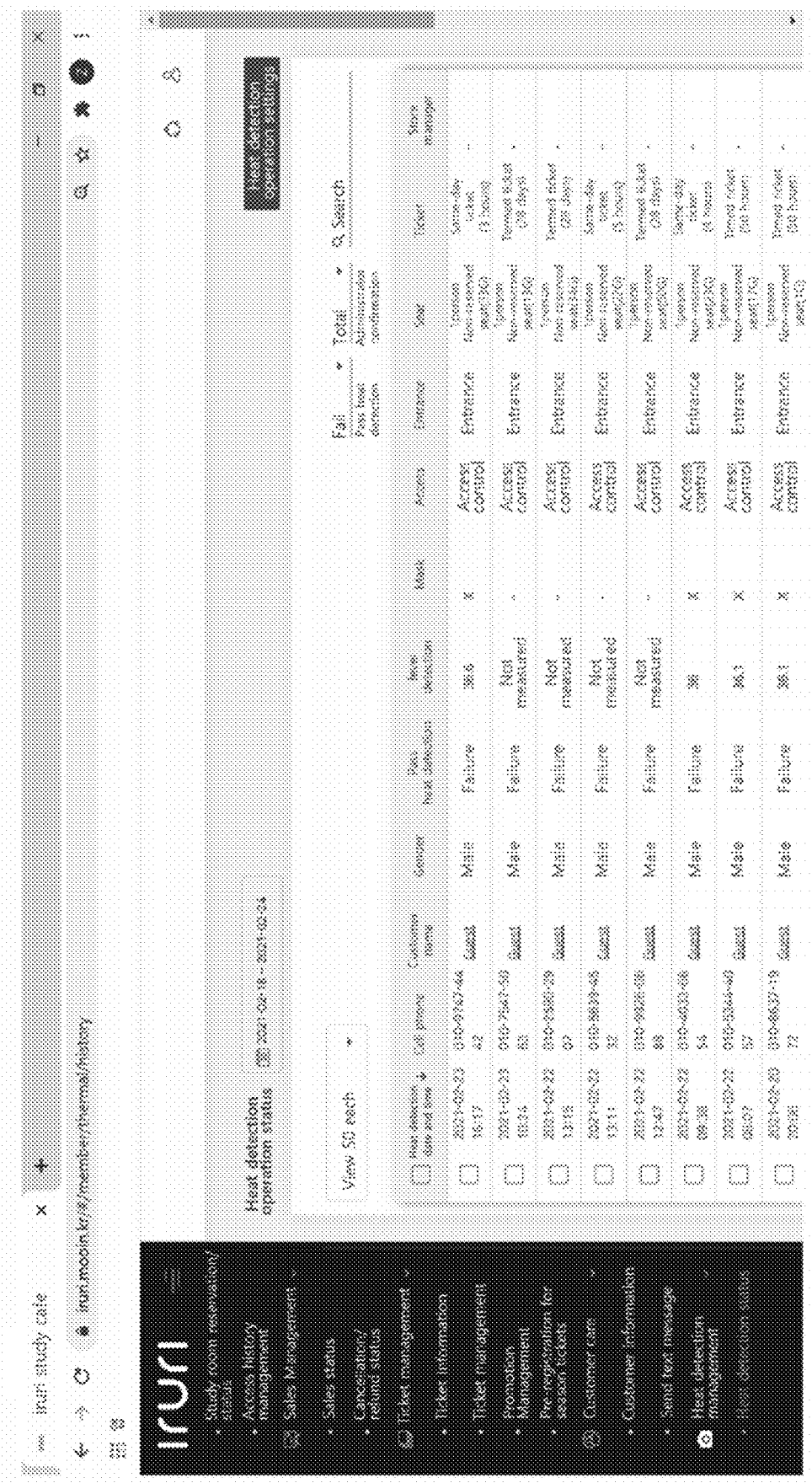
Figure 21:
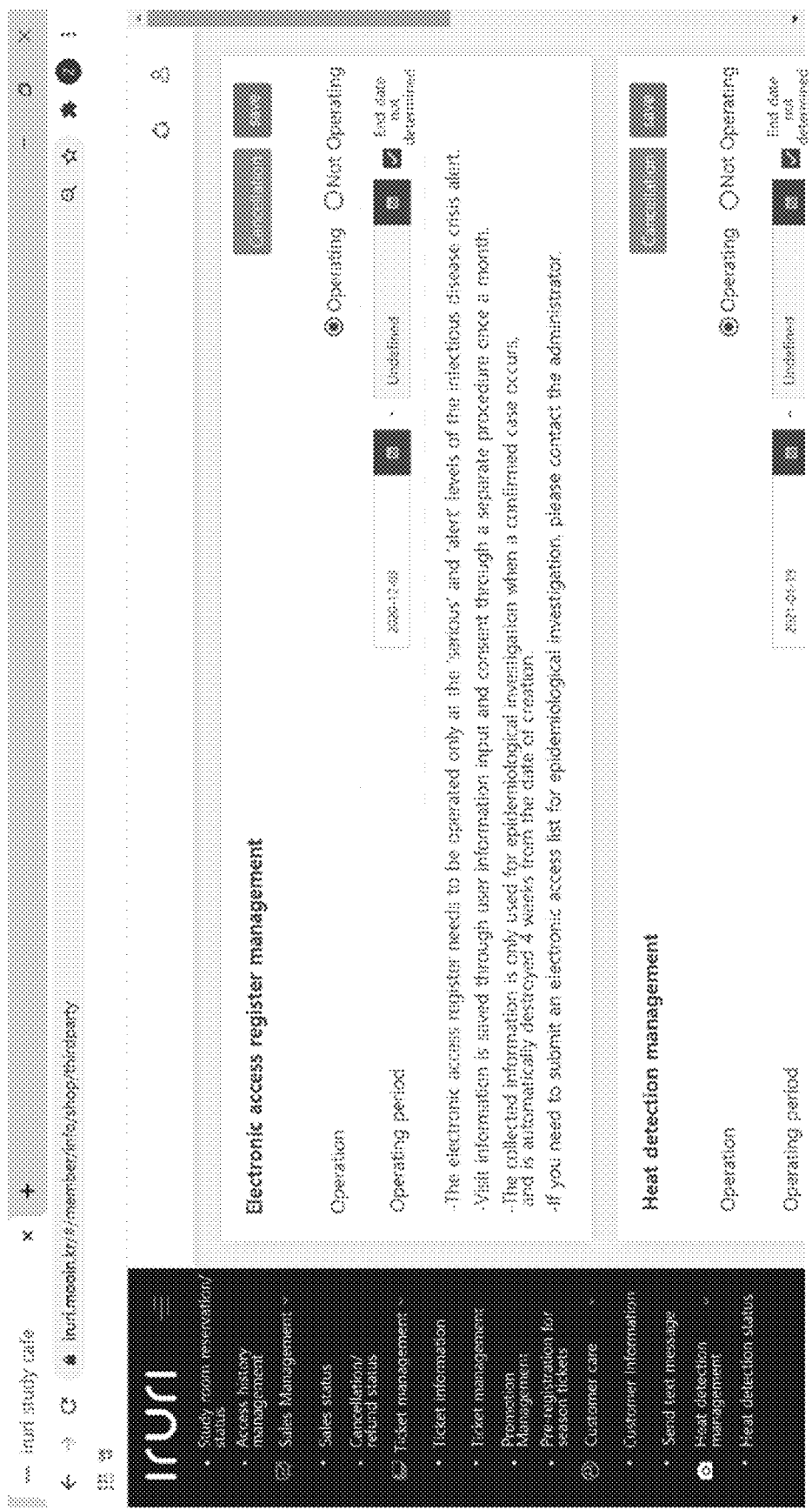
Figure 22:
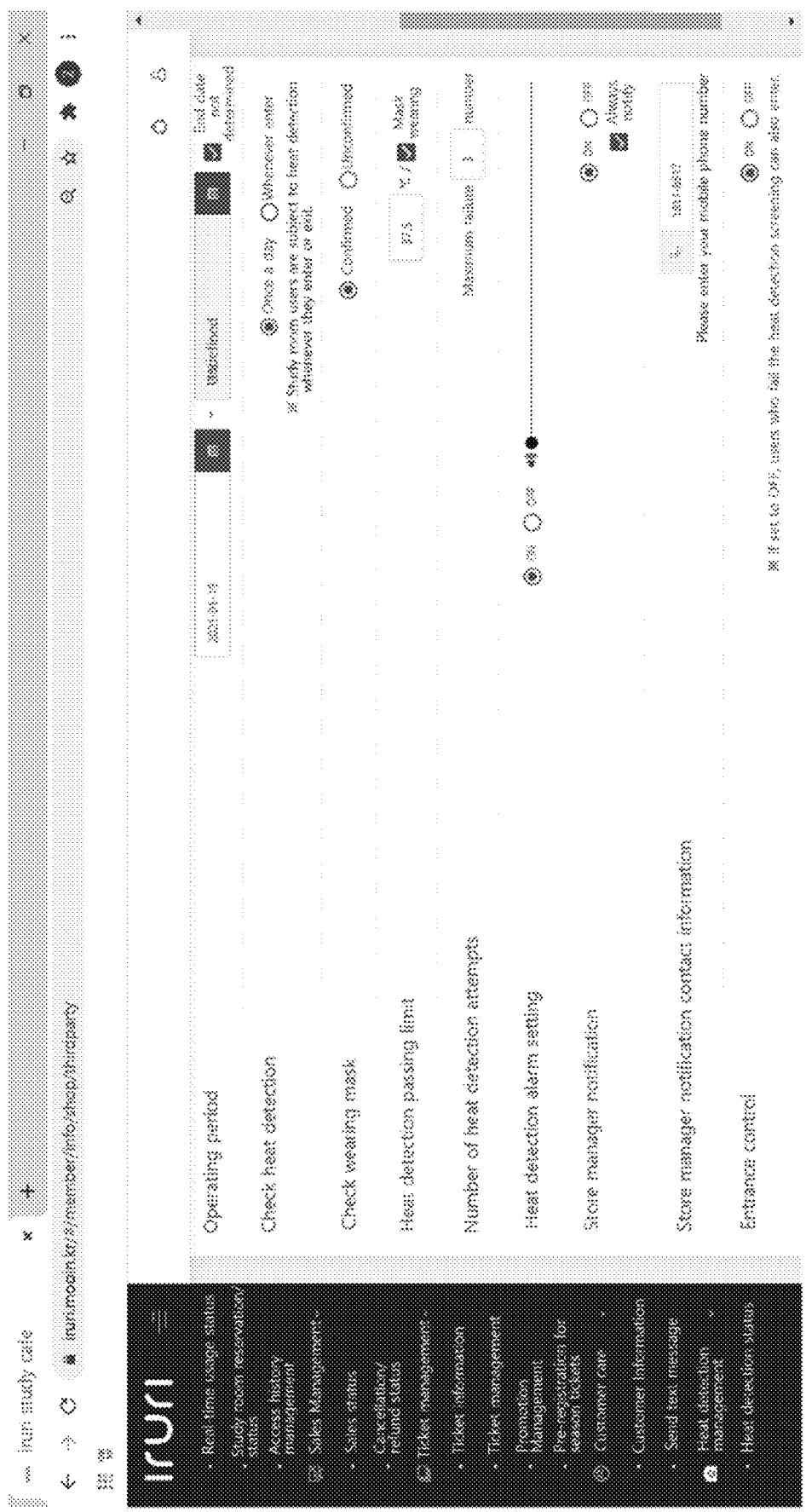

FIG. 20 to FIG. 22 show implementation examples of the heat detection operation status inquiry function, electronic access register management function, and heat detection management function provided by the service server 10.

Below, based on the above-described information regarding unmanned stores, the case where a store operator or system manager remotely manages an unmanned store will be described in detail.

First, with reference to FIG. 2 to FIG. 4, it has been described above that the service server 10 controls the door 50 using the Mqtt server 12, the smart plug 52, the adapter 54, the solid state relay 56, and the deadbolt 58, a store operator or a system manager may perform such door control remotely.

Specifically, a store operator or a system manager may control the door located on a desired floor or location of a desired unmanned store through the user device 30 running unmanned store operation software or unmanned store management software. For example, a store operator or a system manager may select an unmanned store that he or she can control through a user interface provided by the unmanned store operation software or the unmanned store management software. At this time, internally within the software, each store owner or manager may manage shop_id values of stores they can access. Additionally, a store operator or a system manager may select a floor or a location for door control in the unmanned store selected by the store operator or the system manager. For example, a store operator or a system manager may select the door located at the entrance on the first floor, select the door located at the entrance on the second floor, or select the door located at the study room on the first floor. In other words, a store operator or a system manager may provide information including the identifier of the unmanned store where the door to be controlled is located, the identifier for the floor, and the identifier for the location to the service server 10 through unmanned store operation software or unmanned store management software, and then the service server 10 may open and close the door 50 in the manner described above with reference to FIG. 2 to FIG. 4.

In this way, a store owner or a manager can remotely control the entrance to an unmanned store.

Figure 23:
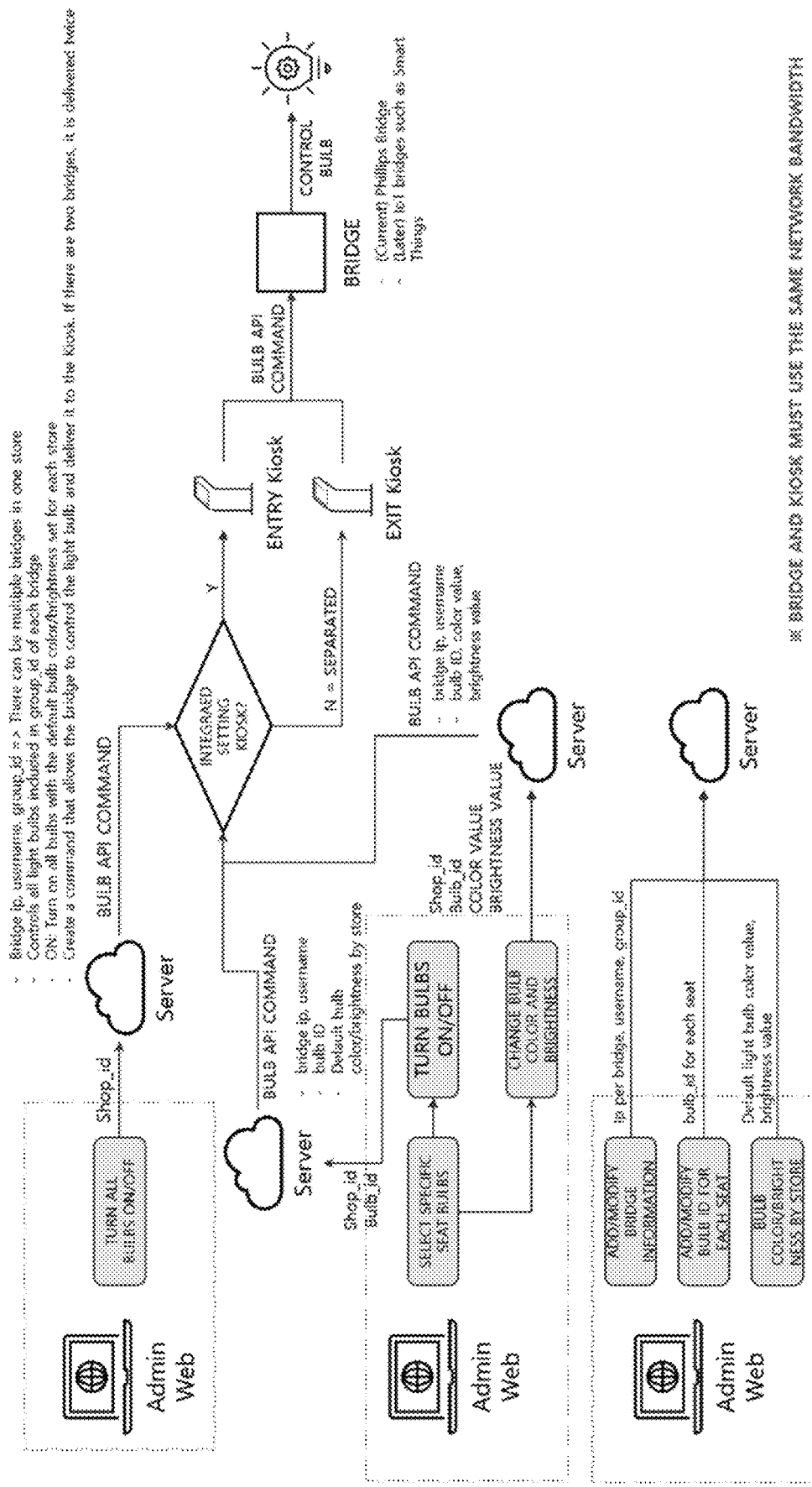
FIG. 23 illustrates a method for managing an unmanned store remotely according to an embodiment of the present invention.

FIG. 23 illustrates a method for managing an unmanned store remotely according to an embodiment of the present invention.

Referring to FIG. 23, in a method for managing an unmanned store remotely according to an embodiment of the present invention, the store operator device (Admin Web) may transmit shop_id value that identifies the unmanned store selected by the store operator to the service server (Server), in order to turn on/off all light bulbs of the unmanned store selected by the store operator.

Alternatively, the store operator device may transmit shop_id value that identifies the unmanned store selected by the store operator and bulb_id value that identifies the selected light bulb to the service server, in order to select a light bulb for a specific seat and turn the selected light bulb on/off in an unmanned store selected by the store operator Alternatively, the store operator device may transmit shop_id value that identifies the unmanned store selected by the store operator, bulb_id value that identifies the selected light bulb, and a desired color value or brightness value to the service server, in order to select a light bulb for a specific seat and to change the color or brightness of the selected light bulb in an unmanned store selected by the store operator.

The service server may deliver a light bulb API command to the kiosk based on information received from the store operator device. If the unmanned store is an integrated kiosk setting that uses only one entry/exit kiosk, the light bulb API command may be transmitted to one entry/exit kiosk, and if the unmanned store is a separated kiosk setting that uses separately configured entry and exit kiosks, the light bulb API command (i.e., the light bulb control command) may be transmitted only to the exit kiosk and not to the entry kiosk. The entry/exit kiosk or the exit kiosk that has received the light bulb control command may perform light bulb control through the bridge in the same manner as described above with reference to FIG. 7 to FIG. 9. To this end, in an integrated kiosk setting, the entry/exit kiosk and bridge must be configured on the same bandwidth network through the Wi-Fi router, and in a separated kiosk setting, the exit kiosk and bridge must be configured on the same bandwidth network through the Wi-Fi router. Also, if necessary, in a separated kiosk setting, the exit kiosk and the bridge may be configured on the same bandwidth network through a Wi-Fi router, while the entry kiosk and bridge may not be configured on different bandwidth networks.

Alternatively, in order to add or modify bridge information, the store operator device may transmit the added or modified IP information for each bridge to the service server, transmit an username value corresponding to the identifier of the user who can control the bridge to the service server, or transmit group_id value to identify multiple light bulbs that can be controlled by one bridge to the service server. Here, the username is a user identifier that can control the bridge, when transmitting a bulb control command from the service server to the bridge, a method such as "[bridge_ip_address]/api/<username>/lights/<bulb_id>/state\" can be used, thereby, the bridge performs light bulb control commands only if the username is registered in the bridge.

Alternatively, the store operator device may transmit bulb_id value that can identify the added or modified light bulb for each seat to the service server in order to add or modify the bulb ID for each seat. Alternatively, the store operator device may transmit a desired basic color value or basic brightness value to the service server in order to set the basic color value or basic brightness value of the light bulb for each store. The service server that receives the above information from the store operator device may change the lighting settings of the unmanned store accordingly.

In this way, store operators can remotely control lighting in unmanned stores, and the above is equally applicable to system managers.

Note that, in the case where the unmanned store is a separated kiosk setting using separately configured entry and exit kiosks, if the light bulb control command is sent to both the entry and exit kiosks, since the light bulb control command may be duplicated and errors may occur in light bulb control in unmanned stores, or the light bulb control service may be implemented unstable, light bulb control commands are transmitted only to the exit kiosk and not to the entry kiosk.

Additionally, in an unmanned store, the entry kiosk is generally installed outside the unmanned store, and the exit kiosk is generally installed inside the unmanned store. However, as described above, in order to perform light bulb control through the kiosk and the bridge, the kiosk and the bridge must be configured as the same bandwidth network through a Wi-Fi router. Considering the characteristics of the unmanned store, the exit kiosk installed inside the unmanned store is placed physically closer to the bridge than the entry kiosk installed outside the unmanned store, and the closer the distance between the kiosk and the bridge, the higher the transmission and reception rate of light bulb control commands when both devices are connected to a network of the same bandwidth, which leads to higher functional stability. In other words, since the entry kiosk is installed outside the door, the physical distance from the bridge inevitably increases, which weakens the network signal strength and thus reduces the stability of the light bulb control service. For this reason, if the unmanned store is a separated kiosk setting using separately configured entry and exit kiosks, the light bulb control command may be transmitted only to the exit kiosk and not to the entry kiosk.

Figure 24:
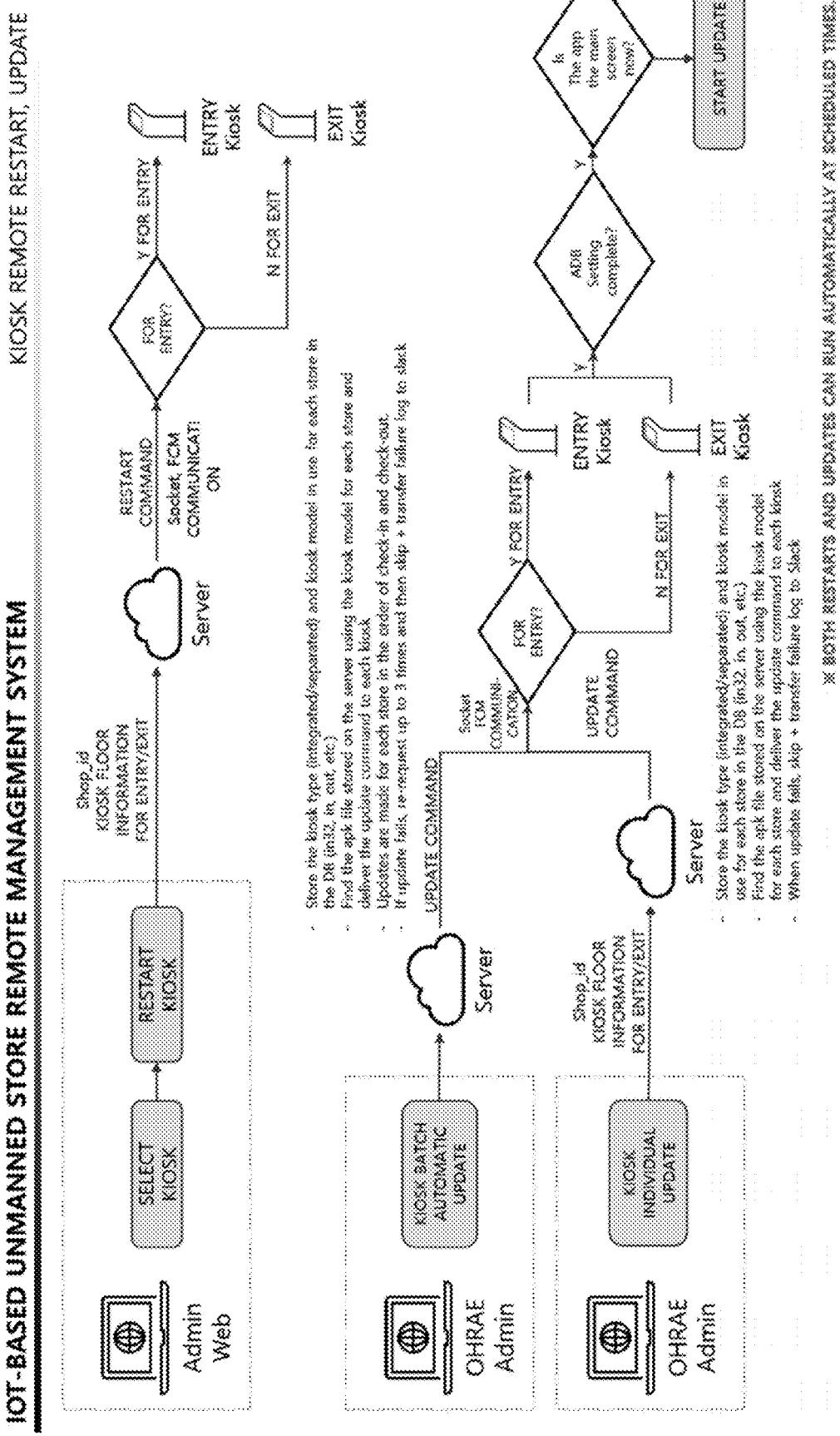
FIG. 24 illustrates a method for managing an unmanned store remotely according to an embodiment of the present invention.
Figure 25:
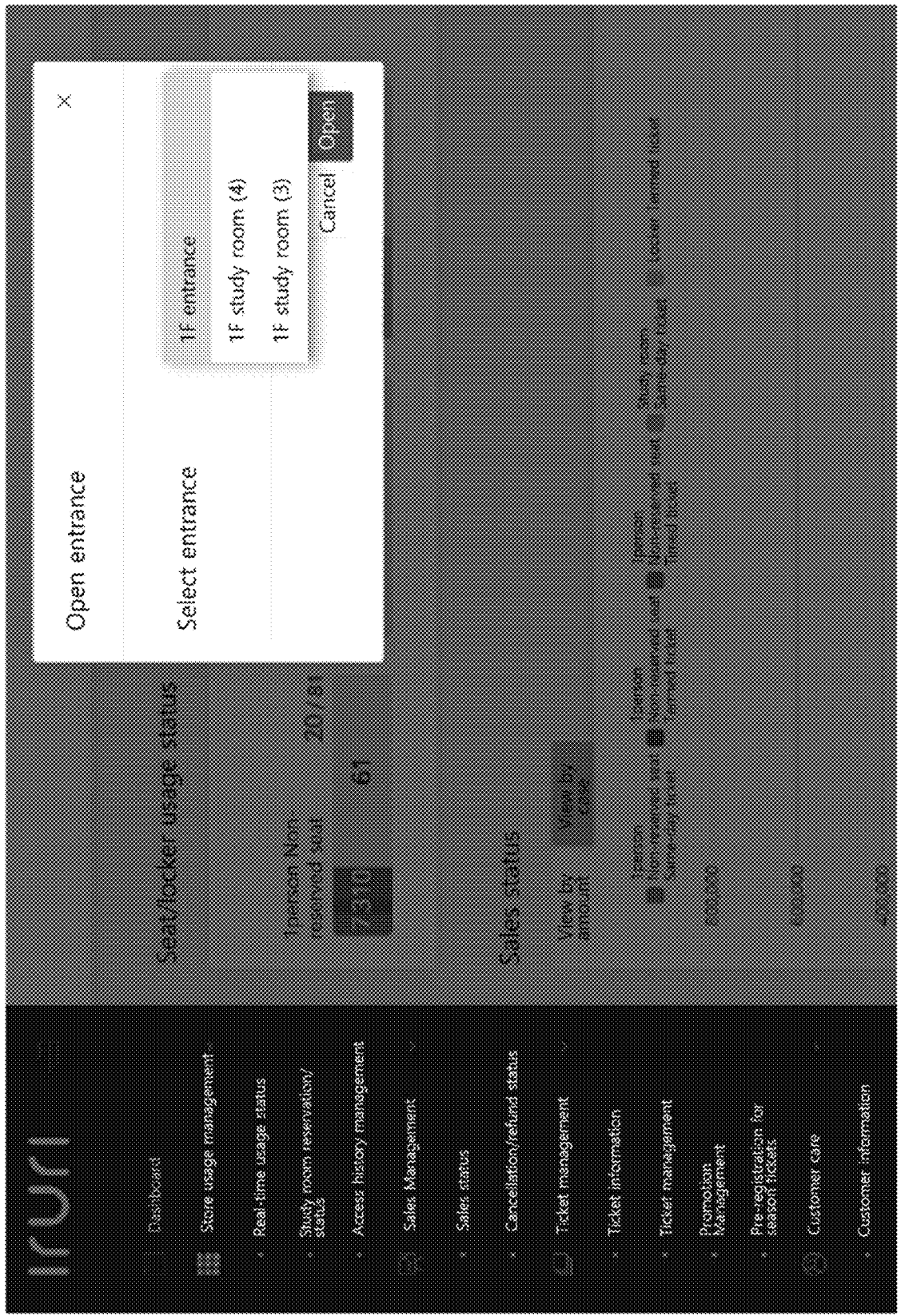
FIG. 25 to FIG. 29 illustrate some implementation examples of a system for managing an unmanned store remotely according to an embodiment of the present invention.
Figure 26:
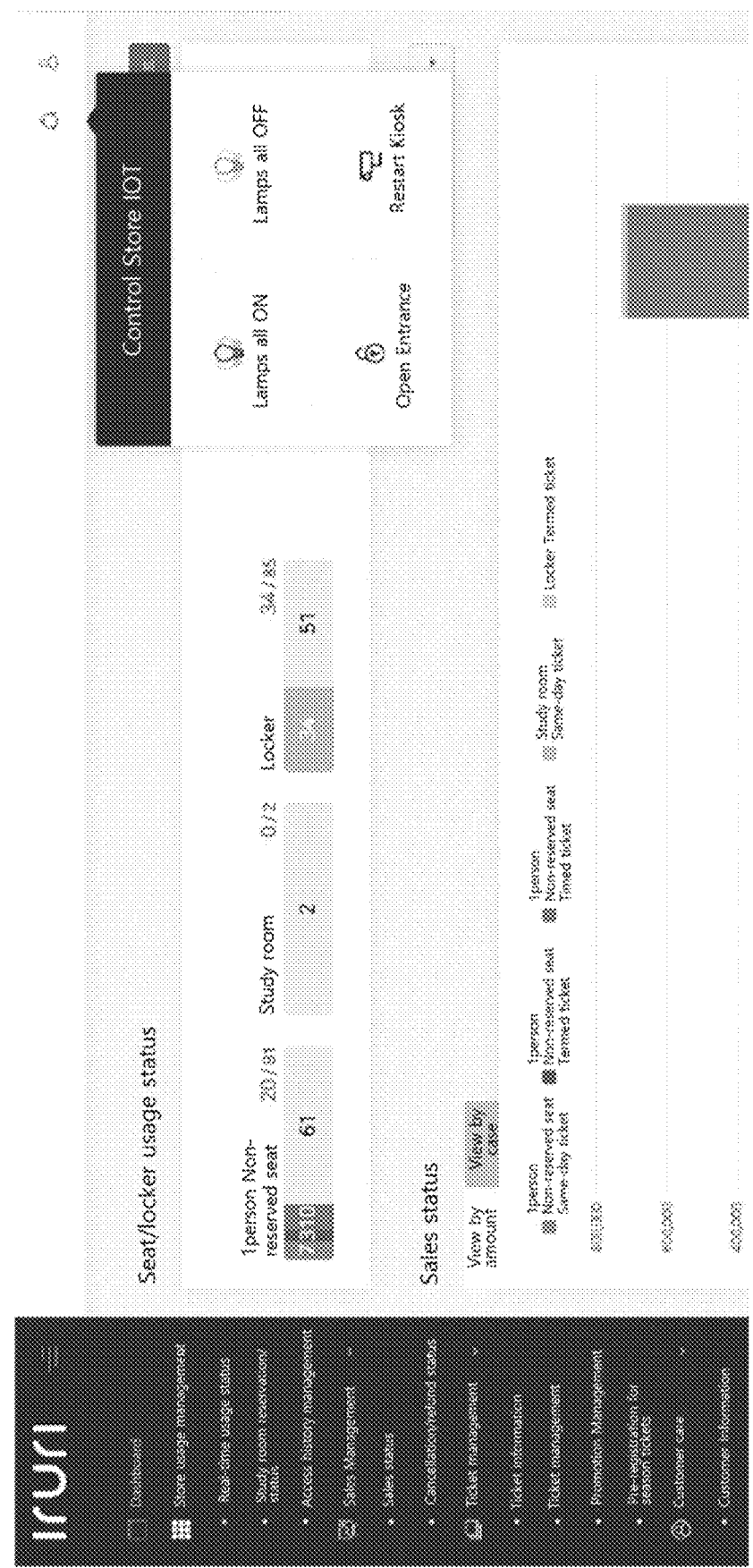
Figure 27:
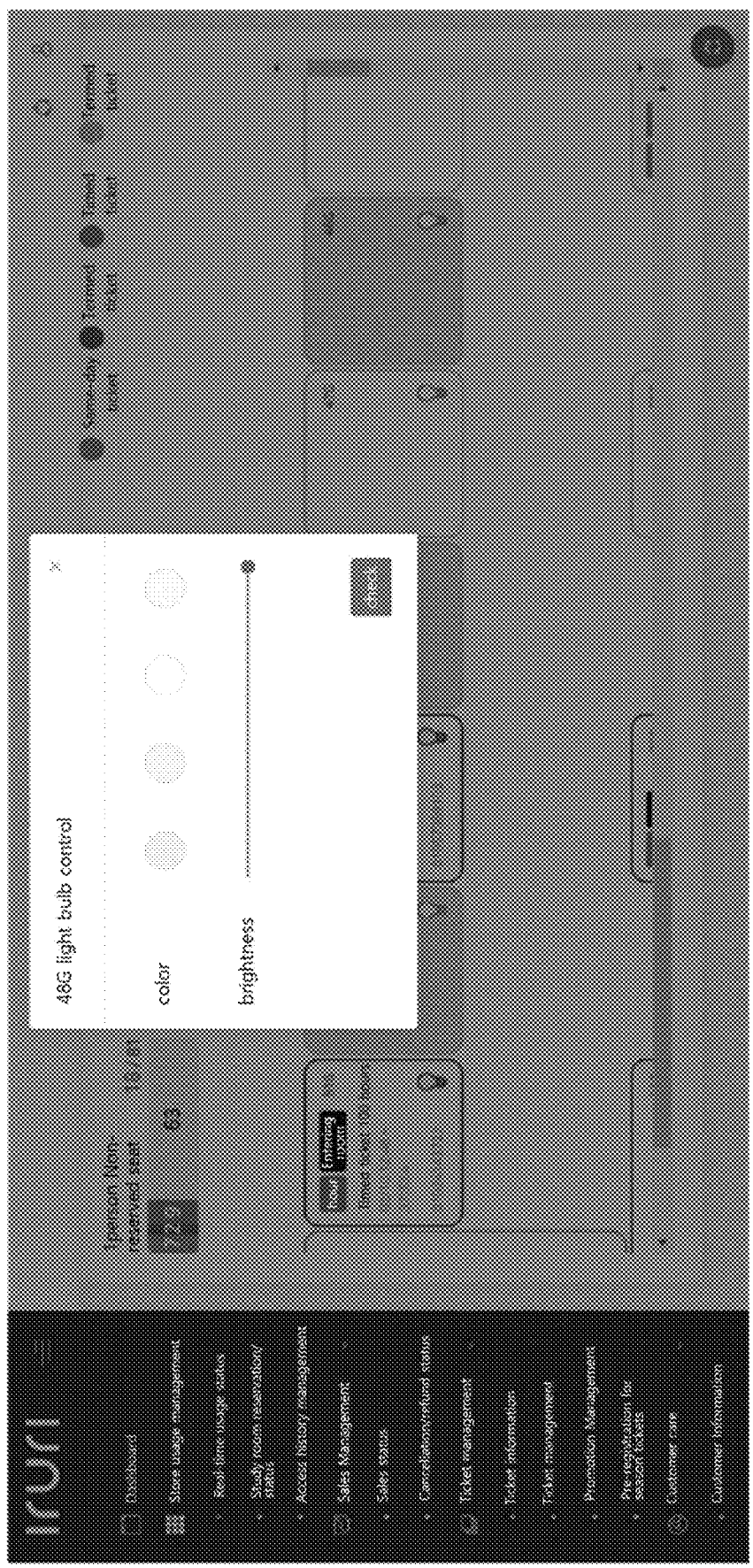
Figure 28:
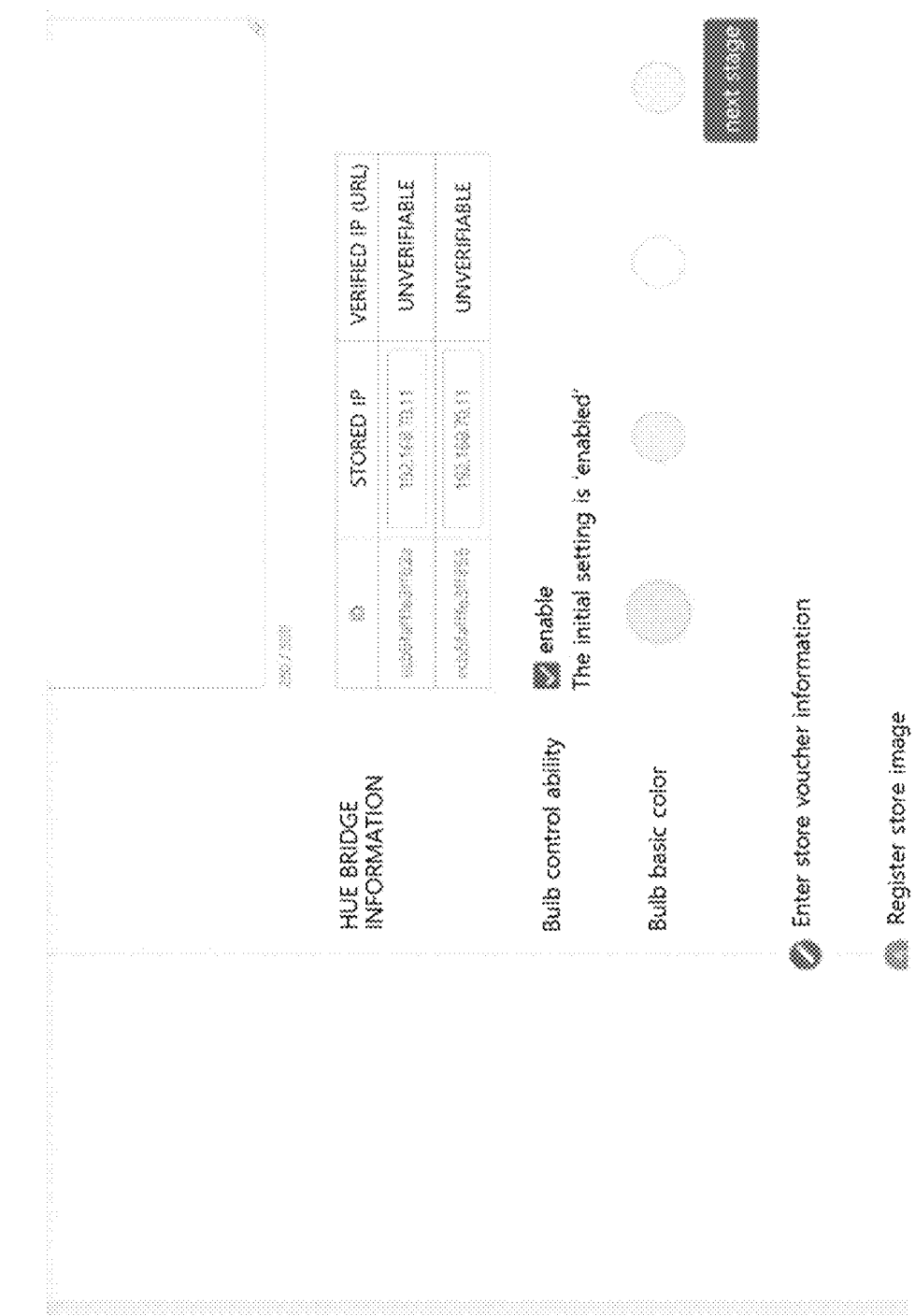
Figure 29:
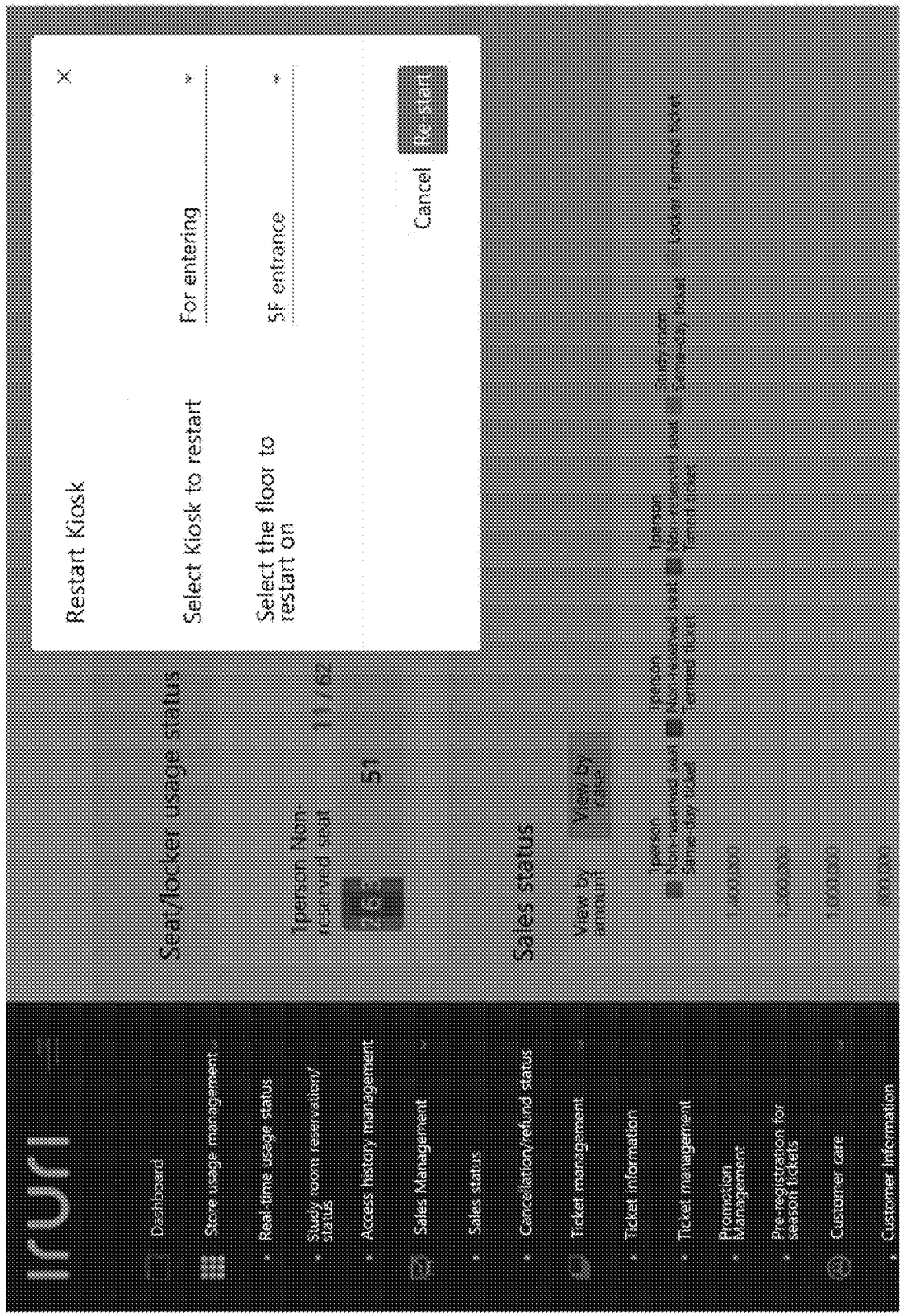

FIG. 24 illustrates a method for managing an unmanned store remotely according to an embodiment of the present invention.

Referring to FIG. 24, the store operator (Admin Web) may remotely select a kiosk and restart the kiosk (i.e., restart the software running on the kiosk) through the user device 30 running the unmanned store operation software. Specifically, shop_id value of the store where the kiosk the store owner wants to restart located, shop_in and shop_out values to distinguish whether the kiosk is for entry or exit, and layer_info value indicating the floor information on which the kiosk is located, etc. are transmitted to the service server, and the service server transmits a restart command to the kiosk through fcm/socket communication. Then, the unmanned store service software running on the kiosk can be restarted.

In this way, store operators can remotely restart kiosks without having to reside or visit the unmanned store, and this function may also be applied to system managers. Additionally, the kiosk to be restarted may be designated as a specific kiosk (for example, the first floor entry kiosk and the third floor exit kiosk of a specific store), or may be designated as all kiosks of a specific store.

Meanwhile, a system manager may automatically update multiple kiosks in batches or individually update only desired kiosks through the user device 30 running unmanned store management software. Here, updating the kiosk may mean updating the unmanned store software running on the kiosk. Specifically, when a system manager ("Orae Admin") transmits the kiosk information to be updated to the service server 10 to start updating the kiosk remotely through the user device 30 running the unmanned store management software, the service server 10 is storing an update image (or apk file) according to the kiosk model installed in the unmanned store, and updating the kiosk can be performed using the update image.

To this end, the kiosk may be running launcher software or program, when the launcher receives a kiosk update command from the system manager, the launcher may download an update image according to the kiosk model to be updated from a server or a storage device where the update image is stored, and then the launcher may perform a kiosk update using the downloaded image.

For example, when the system manager transmits a kiosk update command to the kiosk through the service server 10 for the entry kiosk installed on the first floor and the exit kiosk installed on the second floor of a specific store, the launcher running in each kiosk may download an image called in32.apk for the entry kiosk installed on the first floor and an image called out.apk for the exit kiosk installed on the second floor, and then the launcher may use each image to update the entry kiosk installed on the floor and the exit kiosk installed on the second floor.

In this way, system managers can remotely update kiosks.

FIG. 25 to FIG. 29 illustrate some implementation examples of a system for managing an unmanned store remotely according to an embodiment of the present invention.

According to the embodiments of the present invention described so far, unmanned stores can be conveniently managed remotely using IoT technology. Specifically, the store operator or system manager can cause the service server to control the door by remotely transmitting data or commands for door control to the service server, or can cause the service server to control the lighting by remotely transmitting data or commands for lighting control to the service server, or can cause the service server to restart the kiosk or update the kiosk by remotely transmitting data or commands for kiosk restart or kiosk update to the service server. Accordingly, the convenience can be increased for store operators and system managers who manage unmanned stores remotely.

Although the embodiments of the present invention have been described in detail above, the scope of the present invention is not limited thereto, and various modifications and improvements made by those skilled in the art using the basic concept of the present invention defined in the following claims also fall within the scope of the present invention.

The invention claimed is:

1. A method for managing an unmanned store remotely, comprising:
    receiving a request for entering from a user;
    determining whether the user's ticket is valid;
    determining whether the ticket is in enter state or go out state when the ticket is valid; and
    opening a door by controlling a short signal provided from a solid state relay when the ticket is in enter state,
    wherein the opening a door comprises:
    searching, by a service server, for a serial number of a smart plug that controls the door;
    transmitting, by the service server, a door opening command to an Mqtt server based on the serial number;
    transmitting, by the Mqtt server, a smart plug power ON command corresponding to the serial number to the smart plug; and
    after the smart plug is switched to ON state according to the smart plug power ON command, supplying power to the solid state relay by the smart plug supplying power to an adapter,
    wherein the smart plug is connected to the Mqtt server through a Wi-Fi network,
    wherein, by customizing a control code controlling the smart plug, the smart plug automatically provides power to the adapter to open the door when the smart plug detects that a connection with the Wi-Fi network is lost, and the smart plug cut off the power provided to the adapter to close the door when the smart plug detects that the smart plug is reconnected to the Wi-Fi network.

2. The method of claim 1, wherein:
    the opening a door comprising:
    causing the solid state relay to output a short signal for a predetermined time by controlling an Mqtt server and a smart plug electrically connected to the solid state relay.

3. The method of claim 1, further comprising:
    encouraging the user to purchasing a ticket when the ticket is invalid.

4. The method of claim 1, further comprising:
    determining whether the ticket holds an assigned seat; and
    opening a door by controlling the short signal when the ticket holds the assigned seat.

5. The method of claim 4, further comprising:
    inducing the user to select a seat when the ticket does not hold the assigned seat.

6. The method of claim 1, further comprising:
    determining whether a door floor corresponding to the door and the seat floor designated by the ticket are the same;
    when it is determined that the door floor and the seat floor are not the same, determining whether the door floor and the common floor are the same;

when it is determined that the door floor and the seat floor are the same, opening the door; and when it is determined that the door floor and the seat floor are not the same, and the door floor and the common floor are not the same, not opening the door.

7. The method of claim 1, further comprising:
receiving a store identifier identifying a store to which the door is to be opened among a plurality of stores;
receiving a door identifier identifying a door to be opened a plurality of doors of the store identified by the store identifier;
obtaining a serial number of a smart plug controlling a door to be opened among the plurality of doors from the database using at least one of the store identifier and the door identifier; and
using the obtained serial number of the smart plug, opening a door by controlling a short signal provided from the solid state relay to be opened by turning the smart plug to ON state and then having the smart plug supply power to the adapter and the solid state relay.

8. A method for managing an unmanned store remotely, comprising:
receiving a request for going out/leaving from a user;
determining whether the user's ticket is valid;
determining whether the user's usage time has been exceeded when the ticket is valid; and
opening a door by controlling a short signal provided from a solid state relay when the user's usage time has not been exceeded,
wherein the opening a door comprises:
searching, by a service server, for a serial number of a smart plug that controls the door;
transmitting, by the service server, a door opening command to a Mqtt server based on the serial number;
transmitting, by the Mqtt server, a smart plug power ON command corresponding to the serial number to the smart plug; and
after the smart plug is switched to ON state according to the smart plug power ON command, supplying power to the solid state relay by the smart plug supplying power to an adapter,
wherein the smart plug is connected to the Mqtt server through a Wi-Fi network,
wherein, by customizing a control code controlling the smart plug, the smart plug automatically provides power to the adapter to open the door when the smart plug detects that a connection with the Wi-Fi network is lost, and the smart plug cut off the power provided to the adapter to close the door when the smart plug detects that the smart plug is reconnected to the Wi-Fi network.

9. The method of claim 8, wherein:
the opening a door comprising:
causing the solid state relay to output a short signal for a predetermined time by controlling an Mqtt server and a smart plug electrically connected to the solid state relay.

10. The method of claim 8, further comprising:
encouraging the user to purchasing a ticket when the ticket is invalid.

11. The method of claim 8, further comprising:
determining whether the user has completed settlement of an excess amount when the user's usage time exceeds; and
opening a door by controlling the short signal when the user has completed settlement of the excess amount.

12. The method of claim 11, further comprising:
inducing the user to settle the excess amount when the user has not completed settlement of the excess amount.

13. The method of claim 8, further comprising:
determining whether a door floor corresponding to the door and the seat floor designated by the ticket are the same;
when it is determined that the door floor and the seat floor are not the same, determining whether the door floor and the common floor are the same;
when it is determined that the door floor and the seat floor are the same, opening the door; and
when it is determined that the door floor and the seat floor are not the same, and the door floor and the common floor are not the same, not opening the door.

14. A method for managing an unmanned store remotely, comprising:
receiving, by a service server, a light bulb control request including an unmanned store identifier (shop_id) from a store operator device;
identifying, by the service server, an unmanned store corresponding to the unmanned store identifier (shop_id);
determining, by the service server, whether the identified unmanned store is an integrated kiosk setting using only an entry/exit kiosk that handles all entering, going out, and leaving, or a separated kiosk setting using a separately configured an entry kiosk and an exit kiosk;
transmitting, by the service server, a light bulb control command corresponding to the light bulb control request to the entry/exit kiosk when it is determined that the identified unmanned store is the integrated kiosk setting;
transmitting, by the service server, the light bulb control command only to the exit kiosk and does not transmitting the light bulb control command to the entry kiosk when it is determined that the identified unmanned store is the separated kiosk setting; and
controlling, by the entry/exit kiosk or the exit kiosk which has received the light bulb control command, a light bulb by transmitting the light bulb control command received from the service server to a bridge,
wherein the entry/exit kiosk or the exit kiosk and the bridge are configured on the same bandwidth network through a Wi-Fi router,
wherein the controlling the light bulb by transmitting the light bulb control command received from the service server to a bridge, comprises:
when the service server receives a desired color value or a desired brightness value of the light bulb together with the unmanned store identifier (shop_id) from the store operator device, controlling color or brightness of the light bulb using the received color value or brightness value, and
when the service server does not receive the desired color value or the desired brightness value of the light bulb from the store operator device, controlling color or brightness of the light bulb using a basic color value or a basic brightness value of the light bulb preset for each store.

15. The method of claim 14, wherein:
the light bulb control request comprises at least one of a request to turn on/off all light bulbs in an unmanned store, a request to turn on/off only light bulbs of a specific seat, and a request to change color and brightness of light bulbs of a specific seat.

16. The method of claim 15, wherein:
the light bulb control request that the service server receives from the store operator device further comprises a bulb identifier (bulb_id) of a specific seat when the bulb control request is a request to turn on/off only light bulbs of the specific seat, and
the service server generates the light bulb control command based on the bulb identifier (bulb_id) of the specific seat.

17. The method of claim 15, wherein:
the light bulb control request that the service server receives from the store operator device further comprises a bulb identifier (bulb_id) of a specific seat, a desired color value, and a desired brightness value when the light bulb control request is a request to change color and brightness of light bulbs of the specific seat, and
the service server generates the light bulb control command based on the bulb identifier (bulb_id) of the specific seat, the desired color value, and the desired brightness value.

18. The method of claim 14, further comprising:
transmitting, by the store operator device, IP information for each bridge added or modified to add or modify information about the bridge to the service server, transmitting, by the store operator device, a username value for identifying a bridge to the service server, or transmitting, by the store operator device, a group_id value for identifying multiple light bulbs that can be controlled by one bridge to the service server.

19. The method of claim 14, further comprising:
transmitting, by the store operator device, a bulb identifier (bulb_id) value for identifying light bulb added or modified for each seat to add or modify the bulb ID for each seat to the service server.

20. The method of claim 14, further comprising:
transmitting, by the store operator device, a desired basic color value or a basic brightness value to set a basic color value or a basic brightness value of light bulbs for each store to the service server.

* * * * *